US012211017B2

(12) United States Patent
Chan et al.

(10) Patent No.: US 12,211,017 B2
(45) Date of Patent: Jan. 28, 2025

(54) OFFLINE CRYPTOCURRENCY TRANSACTIONS

(71) Applicant: PAYPAL, INC., San Jose, CA (US)

(72) Inventors: Christopher Man-kit Chan, San Jose, CA (US); Michael Jim Tien Chan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 214 days.

(21) Appl. No.: 17/722,776

(22) Filed: Apr. 18, 2022

(65) Prior Publication Data

US 2023/0334444 A1  Oct. 19, 2023

(51) Int. Cl.
*G06Q 20/06* (2012.01)
*G06Q 20/36* (2012.01)
*G06Q 20/38* (2012.01)

(52) U.S. Cl.
CPC ..... *G06Q 20/0658* (2013.01); *G06Q 20/3678* (2013.01); *G06Q 20/3829* (2013.01); *G06Q 20/3827* (2013.01)

(58) Field of Classification Search
CPC ........... G06Q 20/0658; G06Q 20/3678; G06Q 20/3829; G06Q 20/3827
See application file for complete search history.

(56) References Cited

U.S. PATENT DOCUMENTS

| 8,949,596 B2* | 2/2015 | Yin ........................ H04L 63/108 713/168 |
|---|---|---|
| 9,660,809 B2 | 5/2017 | Krapf et al. |
| 9,672,499 B2 | 6/2017 | Yang et al. |
| 10,331,882 B2 | 6/2019 | Singleton et al. |

(Continued)

FOREIGN PATENT DOCUMENTS

WO   WO 2022/073213 A1   4/2022

OTHER PUBLICATIONS

Takahashi et al. "Short Paper: Secure Offline Payments in Bitcoin", 2019, retrieved from https://fc19.ifca.ai/wtsc/SecureOfflinePayments.pdf (Year: 2019).*

(Continued)

*Primary Examiner* — Patrick McAtee
*Assistant Examiner* — Scott Michael Diroma
(74) *Attorney, Agent, or Firm* — Haynes and Boone, LLP

(57) ABSTRACT

Methods and systems are presented for providing a framework for facilitating offline cryptocurrency transactions. A first application executed in a first secure enclave of a first device can register itself with a cryptocurrency computer network for initiating offline cryptocurrency transactions and reserve a denomination of cryptocurrency for the offline cryptocurrency transactions based on a token. The first application initiates an offline cryptocurrency transaction with a second application executed in a second enclave of a second device by transmitting a request comprising the token via a peer-to-peer connection. The second application verifies the request based on the token and attributes associated with the first application and the first secure enclave. Upon accepting the request, the second application stores the token in the second secure enclave. When a connectivity with a distributed ledger is available, the second application commits the offline cryptocurrency transaction to the distributed ledger.

20 Claims, 11 Drawing Sheets

(56) References Cited

U.S. PATENT DOCUMENTS

| | | |
|---|---|---|
| 11,121,873 B2 | 9/2021 | Schmaltz et al. |
| 11,295,302 B2* | 4/2022 | Androulaki ............ H04L 9/3228 |
| 11,861,612 B2* | 1/2024 | Zhang ..................... G06F 16/27 |
| 2014/0074716 A1* | 3/2014 | Ni ......................... G06F 21/606 |
| | | 705/44 |
| 2017/0230184 A1 | 8/2017 | Alwarappan et al. |
| 2020/0302429 A1 | 9/2020 | Anton et al. |
| 2021/0035090 A1 | 2/2021 | Iannaccone |
| 2022/0045869 A1* | 2/2022 | Skeete ................. G06K 7/1417 |
| 2022/0138321 A1* | 5/2022 | Shrestha ............... G06F 16/285 |
| | | 713/187 |

OTHER PUBLICATIONS

Wikipedia "HMAC", retrieved from wayback machine for Apr. 17, 2022, https://web.archive.org/web/20220417192752/https://en.wikipedia.org/wiki/HMAC (Year: 2022).*

Treebold "How to Cash a Third-Party Check", encyclopedia.com, retrieved from wayback machine for Oct. 19, 2020 https://web.archive.org/web/20201019220902/https://www.encyclopedia.com/articles/how-to-cash-a-third-party-check/ (Year: 2020).*

International Search Report and Written Opinion for Application No. PCT/US2023/016943 mailed on Jul. 27, 2023, 11 pages.

* cited by examiner

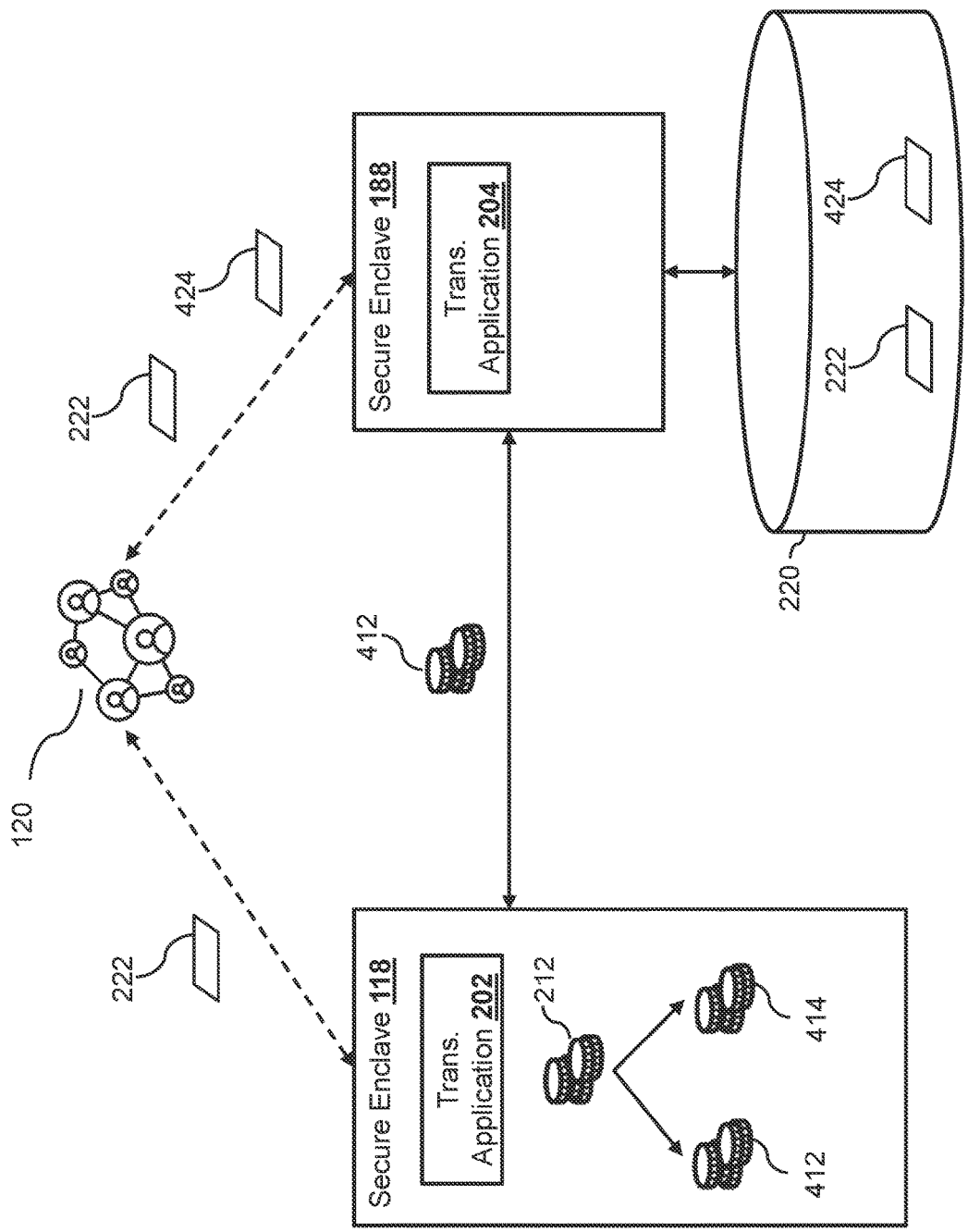

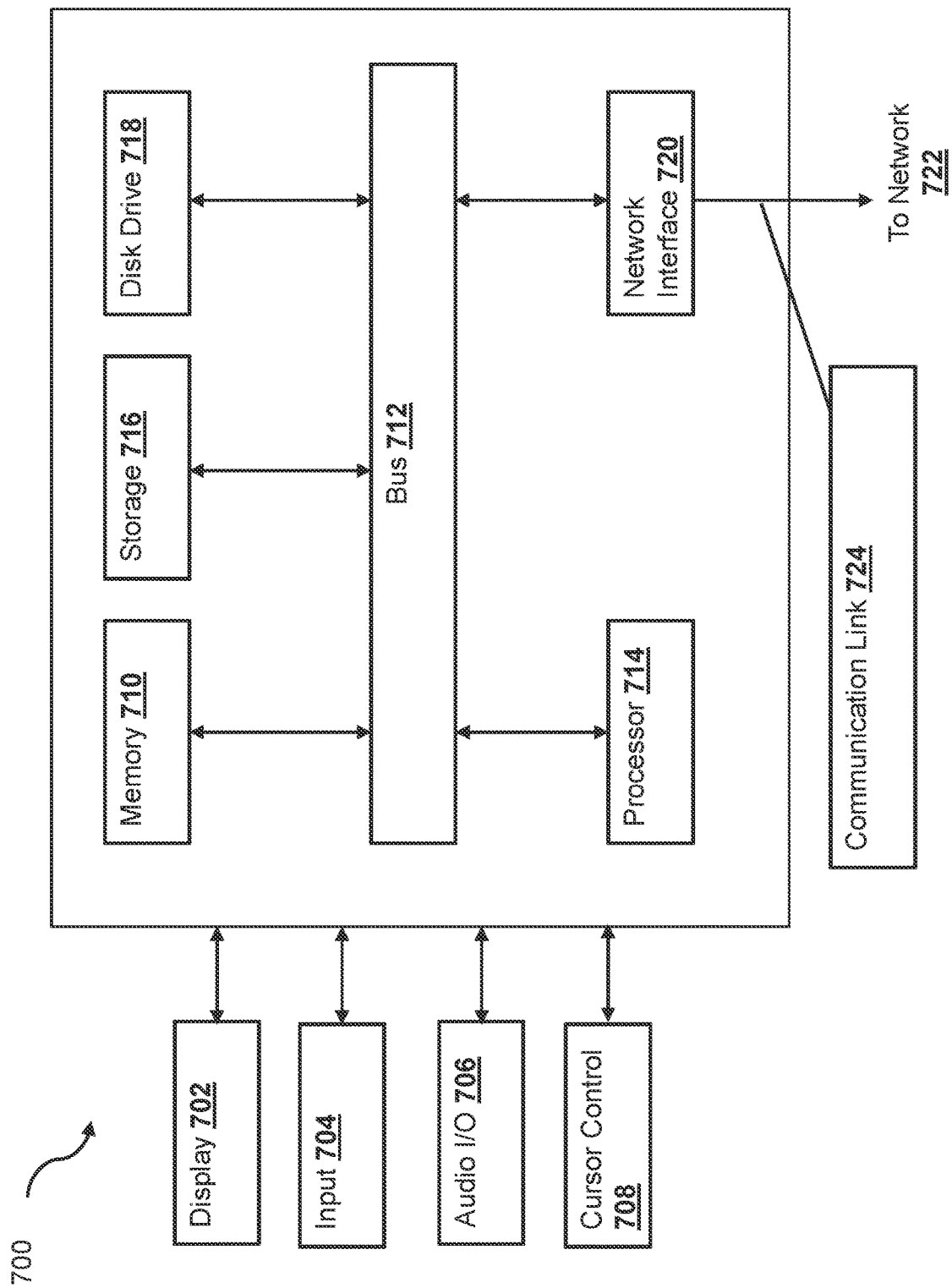

OFFLINE CRYPTOCURRENCY TRANSACTIONS

BACKGROUND

The present specification generally relates to cryptocurrency transactions, and more specifically, to a computer framework for facilitating offline cryptocurrency transactions according to various embodiments of the disclosure.

RELATED ART

As an increasing number of merchants are accepting cryptocurrency as a payment instrument, cryptocurrency is becoming more popular among the public. For example, many people can now use cryptocurrency to purchase goods and services from numerous merchants. However, due to the technical requirements of processing transactions using cryptocurrency, there remains several disadvantages when transacting using cryptocurrency. For example, the decentralized and distributed nature of managing cryptocurrency requires that each transaction be verified (e.g., by performing a proof-of-work or a proof-of-stake process, etc.) and recorded on a distributed ledger (e.g., a distributed blockchain) by a set of computer nodes. This process ensures that the amount of cryptocurrency being spent in association with the transaction is in possession of a sender of the transaction at the time of the transaction, and that the amount has not been spent by the sender prior to the transaction, thereby maintaining the integrity of the cryptocurrency system.

However, such a requirement also means that a conventional cryptocurrency transaction cannot be conducted when the device(s) involved in the transaction has insufficient access to the distributed ledger (i.e., the set of computer nodes that manages the distributed ledger) at the time the transaction is being conducted (e.g., when the connectivity of the devices is limited such that transaction data associated with the transaction cannot be transmitted from the device(s) to the set of computer nodes, etc.). Furthermore, it takes a large amount of computer resources to complete a cryptocurrency transaction due to the verification (e.g., proof-of-work, proof-of-stake, etc.) requirements. Thus, a substantial amount of computer resources is consumed every time a cryptocurrency transaction is processed, and the time required for processing cryptocurrency transactions can be long (which may take several minutes or even hours).

The challenges described above may prevent a more widespread use of cryptocurrency to perform transactions. Thus, there is a need for providing a framework for facilitating cryptocurrency transactions that can overcome these challenges.

BRIEF DESCRIPTION OF THE FIGURES

FIG. 4 illustrates an example of dividing a token into multiple sub-tokens for conducting offline cryptocurrency transactions according to an embodiment of the present disclosure;

FIG. 7 is a block diagram of a system for implementing a device according to an embodiment of the present disclosure.

Figure 1:
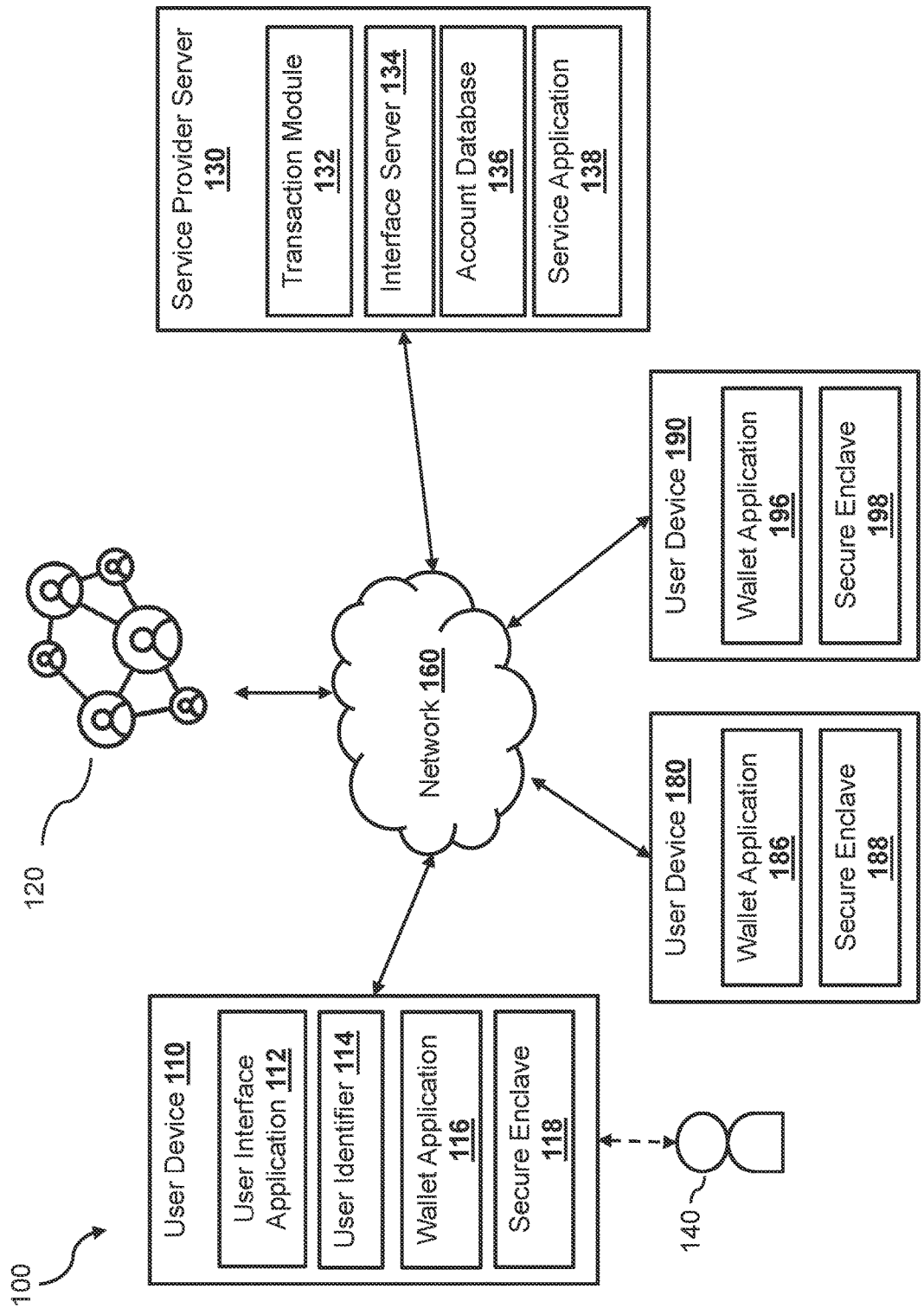
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for facilitating offline cryptocurrency transactions based on transmissions and verifications of tokens between secured enclaves of devices using a transaction communication protocol. Traditionally, cryptocurrency transactions are conducted based on recording transaction data in a decentralized and distributed ledger (e.g., a blockchain). Copies of the ledger are stored in a distributed manner across multiple computers (also referred to as computer nodes) in a cryptocurrency network. When a new transaction (e.g., a transaction for transferring an amount of cryptocurrency from a sender account to a recipient account) is broadcasted, multiple computer nodes within the cryptocurrency computer network may compete against each other to process the new transaction by performing a required verification routine (e.g., a proof-of-work or a proof-of-stake routine), which consumes a substantial amount of computer processing resources. The one computer node that has completed the required routine the fastest would record the transaction on the ledger and receive a compensation (e.g., a mined coin and/or a service fee, etc.). Such a transaction that is verified and recorded by the cryptocurrency computer network in real-time (e.g., as the transaction is being conducted) is referred to an online cryptocurrency transaction, as the device(s) involved in conducting the transaction (e.g., the device associated with the sender account, the device associated with the recipient account, etc.) is required to connect with the distributed ledger in order to complete the transaction.

The verification and recording process ensures that the sender account does in fact have ownership over the amount of cryptocurrency at the time the transaction is being broadcasted, and that the amount of cryptocurrency will not be double-spent by the sender account, thereby maintaining the integrity of the cryptocurrency system. However, the verification process (e.g., the proof-of-work process, the proof-of-stake process, etc.) can consume a large amount of computer resources within the cryptocurrency computer network. Furthermore, the requirement of broadcasting and recording the transaction data to the distributed ledger in real-time (as required by processing online cryptocurrency transactions) prevents transactions to be conducted when connectivity to the cryptocurrency computer network is limited (e.g., insufficient bandwidth to transfer the transaction data from the device associated with the sender account to any computer node within the cryptocurrency computer network).

As such, according to various embodiments of the disclosure, a framework (also referred to as "an offline cryptocurrency transaction framework") is provided for facilitating cryptocurrency transactions even when the devices involved in the transactions lack connectivity to the distributed ledger at the time that the transactions are conducted. Cryptocurrency transactions that do not require devices involved in the transactions to have connectivity to the distribute ledger at the time the transactions are conducted are referred to as offline cryptocurrency transactions. In some embodiments, the framework as disclosed herein enables offline cryptocurrency transactions while maintaining the integrity of the cryptocurrency, through the storing, transmission, and verification of tokens among computer applications (also referred to as "transaction applications") that are executed within secure enclaves of devices. When an offline cryptocurrency transaction is conducted under the framework as disclosed herein, the transaction data associated with the transaction is not verified or recorded by the cryptocurrency computer network at the time the transaction is conducted. Thus, offline cryptocurrency transactions can be conducted by devices that have temporary limited connectivity with the distributed ledger (and/or the cryptocurrency computer network). Subsequent to conducting the offline cryptocurrency transaction (e.g., a period of time after the offline cryptocurrency transaction is completed, such as an hour, a day, etc.) and when the connectivity of the device to the distributed ledger is restored, the transaction data may be uploaded to the computer node(s) within the cryptocurrency computer network for verification and recordation to the distributed ledger.

Under the framework, a first transaction application that is executed within a first secure enclave of a first device associated with a first cryptocurrency account (e.g., a first digital wallet) may register itself with the cryptocurrency computer network for initiating offline cryptocurrency transactions. A secure enclave is a dedicated hardware subsystem within a device that includes at least a processor and a memory and that is separated from the main processor and memory associated with the device. The secure enclave is isolated from the main processor and designed to store data that would remain secure even when the main processor of the device becomes compromised. Typically, a secure enclave may include a read-only memory that stores all of the computer software programs (including the transaction application as disclosed herein) to be executed by the secure enclave. Thus, the transaction application may be pre-installed at the factory that manufactures the secure enclave (e.g., similar to a firmware of a device) such that the transaction application is ready for use when the device is purchased by the user. Reading and/or writing of data in the memory (e.g., random access memory) of the secure enclave is controlled by the computer software applications executed within the secure enclave such that no other processors, including the main processor of the device, can access the data stored in the memory of the secure enclave. In some embodiments, the secure enclave may include one or more sensors, such as a frequency sensor, a voltage sensor, a light sensor, etc., for detecting physical tampering of the secure enclave. In some embodiments, upon detecting a possible physical tampering of the secure enclave, a program executed within the secure enclave would automatically be triggered to wipe out the data stored within the secure enclave to further improve the security of the secure enclave.

In some embodiments, the first transaction application may generate a first pair of asymmetrical keys (e.g., a private/public key pair) for application-based signing, which are also known as application-based signing keys. The first transaction application may also generate remote attestation information based on attributes associated with the first secure enclave. In some embodiments, the remote attestation information may include a signed copy of the programming code associated with the first transaction application that is signed using the application-based private key of the first transaction application (which may indicate a make and version number of the first transaction application), attributes associated with the first secure enclave (e.g., a hardware and/or software security capability and configuration of the first secure enclave), a signed copy of the identifier of the first cryptocurrency account that is signed using the application-based private key of the first transaction application, and the application-based public key generated by the first transaction application. The first transaction application may then transmit the remote attestation information to the cryptocurrency computer network to be recorded on the distributed ledger. The remote attestation information serves to show the integrity of the first transaction application and that the first transaction application is configured to maintain the integrity of the cryptocurrency (e.g., the recordation of the signed copy of the code ensures that anyone that has access to the distributed ledger can verify that the first transaction application would behave according to the transaction communication protocol of the framework and would not behave in a malicious manner). The first transaction application may also store the signed remote attestation information in the first secure enclave of the first device.

Once the first transaction application has registered itself with the cryptocurrency computer network for performing offline cryptocurrency transactions, the first transaction application may reserve any portion (or the entirety) of the cryptocurrency possessed by a first user of the first cryptocurrency account for use in one or more offline cryptocurrency transactions for a duration of time. In some embodiments, the first transaction application may enable the first user of the first device, via a user interface presented on the first device, to request for a reservation of any portion of cryptocurrency possessed by the first user through the first cryptocurrency account. For example, when the first user anticipates a need for performing offline cryptocurrency transactions (e.g., planning to go to an area with limited cellular reception such as a remote farmer's market to make purchases, etc.), the first user may instruct the first transaction application to reserve an amount of cryptocurrency for offline cryptocurrency transactions. The first user may specify a particular amount of cryptocurrency (e.g., a particular denomination, such as a coin, five coins, a Satoshi, seven Satoshi, an ether, 10 weis, etc.) to be reserved and a duration of the reservation (e.g., an expiration time, such as 3 hours from a current time, a day from the current time, a month from the current time, etc.).

In response to receiving the request, the first transaction application may generate another pair of asymmetrical keys (e.g., a public/private key pair) for token-based signing, which is known as the token-based keys. The first transaction application may also generate a token to represent the particular denomination for use in the one or more offline cryptocurrency transactions. The token may include a hashed message authentication code (HMAC) address for the token (which can be used by other transaction applications to locate the remote attestation information and other data associated with the first secure enclave and the reserved cryptocurrency denomination stored on the distributed ledger), the particular denomination reserved by the first transaction application and represented by the token, the expiration time of the token, and the remote attestation information of the first transaction application. In some embodiments, the first transaction application may also sign the token using the token-based private key of the first transaction application.

The first transaction application may transmit a request to reserve the particular denomination of cryptocurrency and the token to the cryptocurrency computer network. Upon receiving the request, the cryptocurrency computer network may perform a transaction (e.g., executing a contract) to reserve the particular denomination (to put on hold) owned by the first user for a time period until the expiration time of the token. The reservation of the particular denomination, which is recorded on the distributed ledger as a transaction (e.g., a contract), prevents the particular denomination from being used (e.g., spent) by the first user in any online cryptocurrency transactions in the absence of the corresponding signed token that is signed using the token-based private key of the first transaction application.

Based on the reservation of the particular denomination for the first cryptocurrency account, the cryptocurrency computer network may generate a record that links the token and the remote attestation information to the first cryptocurrency account. The cryptocurrency computer network may store the record on the distributed ledger, such that any devices associated with a cryptocurrency account may download the record to be used for verification purposes in an offline cryptocurrency transaction with the first transaction application. After registering with the cryptocurrency computer network and reserving the particular cryptocurrency denomination, the first transaction application may initiate offline cryptocurrency transactions through the first cryptocurrency account with another transaction application via a peer-to-peer connection, without the need of connecting to the distributed ledger.

For example, the first user may be at a remote farmer's market where cellular connection is limited. When the first user wants to purchase an item from a merchant using cryptocurrency, the first user cannot conduct an online cryptocurrency transaction as neither the first device of the first user nor a second device of the merchant (e.g., a second user) has connectivity with the cryptocurrency computer network. Thus, the first transaction application may be instructed by the first user to perform an offline cryptocurrency transaction with a second transaction application executed within a second secure enclave of the second device (e.g., transferring the particular cryptocurrency denomination from the first cryptocurrency account to a second cryptocurrency account associated with the second device). The first transaction application may establish a peer-to-peer connection with the second transaction application (e.g., a short-range wireless connection such as a Bluetooth® connection, a near-field connection, a WiFi connection, etc.). The first transaction application may transmit a request for performing an offline cryptocurrency transaction with the second transaction application. In some embodiments, the second transaction application may determine whether the connectivity with the distributed ledger is available (i.e., no connectivity or insufficient connectivity to enable the transaction to be conducted or conducted within a threshold measurement), and may decline the request if it is determined that the connectivity with the distributed ledger is available (e.g., online cryptocurrency transactions can be performed by the second device).

If the second transaction application determines to accepts the request, the second transaction application may perform a series of verification processes to verify the security of the first secure enclave and the first transaction application, and the authenticity of the token being transferred to the second cryptocurrency account. In some embodiments, after the second transaction application accepts the request, the first transaction application may sign the token along with a timestamp representing a current time using the token-based private key associated with the first transaction application. The first transaction application may transmit the signed token, the timestamp, and the signed remote attestation information to the second transaction application via the peer-to-peer connection. The second transaction application may have downloaded the remote attestation information associated with the first transaction application and the record that links the token and the remote attestation information of the first transaction application to the first cryptocurrency account prior to receiving the request when the connectivity with the distributed ledger was available to the second transaction application. Thus, the second transaction application may decrypt the signed token using the token-based public key associated with the first transaction application and verify that the token is representative of the particular cryptocurrency denomination (e.g., the particular amount of coins, the particular amount of Satoshis, an either, 10 weis, etc.) of the first cryptocurrency account by comparing the decrypted token against the token in the record.

By decrypting the signed token using the token-based public key associated with the first cryptocurrency account and using the data in the record, the second transaction application may further verify that the first transaction application is associated with the first cryptocurrency account. In some embodiments, the second transaction application may access the remote attestation information associated with the first transaction application included in the record, and determine whether the first secure enclave satisfies a set of security requirements. The set of security requirements may include a make and a version number of secure enclaves (that the secure enclave is made by an approved manufacturer with a version higher than a threshold version number, etc.), a set of hardware/software security requirements (e.g., the presence of certain sensors, such as light sensor, frequency sensor, etc., the presence of certain software security measures, etc.). The set of requirements may be determined automatically by the second transaction application or by a second user of the second device. In some embodiments, the second transaction application may refuse to perform the offline cryptocurrency transaction with the first transaction application if it is determined that the first secure enclave and/or the first transaction application fails to satisfy the set of security requirements.

In some embodiments, the second transaction application may also verify that the timestamp received from the first transaction application indicates a time that is after the time when the token was generated and before the expiration time of the token. In some embodiments, the second transaction application may also determine whether a difference between the current time and the expiration time of the token is larger than a threshold (e.g., 3 hours, a day, etc.) such that the second transaction application has sufficient time to record the transaction on the distributed ledger after completing the offline cryptocurrency transaction with the first transaction application. For example, the second transaction application may refuse to conduct the offline cryptocurrency transaction (e.g., abort the transaction process) when the difference between the current time and the expiration time of the token is not larger than the threshold. If the second transaction application refuses to conduct the offline cryptocurrency transaction, the second transaction application may transmit an abort signal to the first transaction application via the peer-to-peer connection, and remove any data related to the offline cryptocurrency transaction from the second secure enclave.

To continue processing the offline cryptocurrency transaction, the second transaction application may transmit a confirmation signal to the first transaction application via the peer-to-peer connection. The confirmation signal indicates that the second transaction application has accepted the signed token from the first transaction application. The second transaction application may then store the signed token in the second secure enclave of the second device. Upon receiving the confirmation signal, the first transaction application may delete the signed token from the first secure enclave to ensure that the token will not be double-spent or used multiple times (e.g., the first transaction application may no longer use the token in any other offline cryptocurrency transaction). In some embodiments, the first transaction application may transmit a token deletion signal to the second transaction application via the peer-to-peer connection, indicating that the token has been removed from the first secure enclave to confirm that the second transaction application has the only copy of the signed token.

After the offline cryptocurrency transaction between the first and second transaction applications is complete, the second transaction application may monitor the connectivity between the second device and the distributed ledger. For example, the second transaction application may attempt to communicate with a computer node of the cryptocurrency computer network (e.g., periodically such as every five minutes, every hour, etc.). In some embodiments, the second transaction application may be configured to attempt to communicate with a computer node of the cryptocurrency computer network in a progressively shorter interval, such that the second transaction application may attempt to communicate with the cryptocurrency computer network more frequently as it is closer to the expiration time of the token. For example, the second transaction application may begin with attempting to communicate with the cryptocurrency computer network every hour. As it gets closer to the expiration time of the token, the second transaction application may increase the frequency of communication attempts to every five minutes, every minute, every second, etc.

When the second transaction application determines that the connectivity with the distributed ledger (e.g., with a node within the cryptocurrency computer network) is available, the second transaction application may communicate the signed token and other transaction data associated with the offline cryptocurrency transaction between the first cryptocurrency account and the second cryptocurrency account to the node within the cryptocurrency computer network. The communication or transmission of the signed token and the transaction data to the cryptocurrency computer network may trigger the verification and recordation of the offline cryptocurrency transaction on the distributed ledger, in a similar manner as an online cryptocurrency transaction is verified and recorded. Thus, using the framework as disclosed herein, cryptocurrency transactions can be conducted between devices associated with cryptocurrency accounts even when the devices temporarily lose connectivity with the distributed ledger.

In some embodiments, the framework also enables the second transaction application, after completing the offline cryptocurrency transaction with the first transaction application but before committing the offline cryptocurrency transaction to the distributed ledger, to use the signed token to perform another offline cryptocurrency transaction with another transaction application. For example, the second transaction application may also register itself with the cryptocurrency computer network for initiating offline cryptocurrency transactions. The second transaction application may generate remote attestation information based on attributes associated with the second secure enclave. In some embodiments, the remote attestation information may include a signed copy of the programming code associated with the second transaction application that is signed using an application-based private key of the second transaction application (which may indicate a make and version number of the second transaction application), attributes associated with the second secure enclave (e.g., a hardware and/or software security capability and configuration of the second secure enclave), a signed copy of the identifier of the second cryptocurrency account that is signed using the application-based private key of the second transaction application, and the application-based public key generated by the second transaction application. The second transaction application may then transmit the remote attestation information to the cryptocurrency computer network to be recorded on the distributed ledger.

The second transaction application may initiate an offline cryptocurrency transaction with a third transaction application of a third device that is within a threshold distance from the second device. The third transaction application may be executed in a third secure enclave of the third device. In some embodiments, the second transaction application may establish a peer-to-peer connection with the third transaction application, and may transmit a request to conduct an offline cryptocurrency transaction with the third transaction application. The second transaction application may sign the signed token using a token-based private key associated with the second transaction application. By signing the signed token that has already been signed using the token-based private key associated with the first transaction application, the second transaction application establishes a record of a series of trusted transactions (e.g., a chain of offline cryptocurrency transactions) in association with the token. The second transaction application may then transmit the double-signed token, a timestamp representing a current time, the remote attestation information of the second transaction application, and the remote attestation information of the first transaction application, to the third transaction application.

The third transaction application may have downloaded, from the distributed ledger, records (e.g., the remote attestation information and the record) associated with the registration of the first transaction application and the registration of the second transaction application. By decrypting (e.g., using the token-based public key of the second transaction application) and analyzing the data received from the second transaction application, the third transaction application may verify that the token was originated from the first transaction application and has been transferred to the second transaction application during a previous offline cryptocurrency transaction. The third transaction application may also verify the authenticity of the token, the security attributes of the first and second secure enclaves, and the security of the first and second transaction applications using similar techniques as disclosed herein.

The third transaction application may also verify that the difference between the current time and the expiration time of the token is larger than a threshold before continuing to complete the offline cryptocurrency transaction. If the third transaction application determines to complete the offline cryptocurrency transaction, the third transaction application may store the signed token in the third secure enclave of the third device, and may transmit a confirmation signal to the second transaction application via the peer-to-peer connection. Upon receiving the confirmation signal, the second transaction application may delete the signed token from the second secure enclave. After completing the offline cryptocurrency transaction and before the expiration time of the token, the third transaction application may commit the offline cryptocurrency transaction to the distributed ledger by transmitting the signed token and transaction data associated with the chain of offline cryptocurrency transactions (which includes the offline cryptocurrency transaction between the first and second transaction applications and the offline cryptocurrency transaction between the second and third transaction applications) to the cryptocurrency computer network.

In the examples illustrated above, each of the offline cryptocurrency transactions were conducted using the token representing the entire cryptocurrency denomination that was reserved for the transaction application (e.g., the first transaction application). In some embodiments, the framework also enables offline cryptocurrency transactions to be conducted using a portion of the entire cryptocurrency denomination. For example, after generating the initial token (also referred to as the "parent token"), the first transaction application may split the particular cryptocurrency denomination into multiple portions by generating multiple child tokens based on the parent token. Each child token may include a reference to the parent token (e.g., the HMAC address of the parent token), an HMAC address associated with the child token, a timestamp indicating the time that the child token is generated, and a sub-denomination representing a particular portion of the particular cryptocurrency denomination. The first transaction application may then record the child tokens on the distributed ledger in association with the parent token in a similar manner that the parent token is recorded. The first transaction application may then conduct offline cryptocurrency transactions with other transaction applications using the child tokens in a similar manner as conducting offline cryptocurrency transactions using the parent token.

FIG. 1 illustrates a networked system 100, within which the offline cryptocurrency transaction framework may be implemented according to one embodiment of the disclosure. Note that the present techniques may be applied in many different computing and technological environments, however, and are not limited to those shown in the figures. The networked system 100 includes a service provider server 130, a cryptocurrency computer network 120, and user devices 110, 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The cryptocurrency computer network 120 may include multiple computer nodes for managing transactions associated with a cryptocurrency using a decentralized and distributed ledger (e.g., a blockchain). The decentralized and distributed ledger may store transaction data related to cryptocurrency transactions of the cryptocurrency. Each computer node within the cryptocurrency computer network manages a copy of the distributed ledger. When the computer nodes receive transaction data associated with a cryptocurrency transaction from a device (e.g., the user devices 110, 180, and 190, etc.), the computer nodes compete against each other in solving a mathematical problem (which is part of a verification process such as a proof-of-work process or a proof-of-stake process). Once a computer node solves the mathematical problem, the computer node may record the transaction (e.g., in a block) on its copy of the distributed ledger, and broadcast the block and the solution to the mathematical problem to the other computer nodes, such that the other computer nodes can update their copies of the distributed ledger. The computer node that won (e.g., the fastest to solve the mathematical problem) would be granted the right to receive a compensation (e.g., in the form of a mined coin and/or a service fee charged to a party to the transaction).

The user device 110, in one embodiment, may be utilized by a user 140 to interact with the cryptocurrency computer network 120, the service provider server 130, and other user devices (e.g., the user devices 180 and 190, etc.) over the network 160. For example, the user 140 may use the user device 110 to conduct cryptocurrency transactions through a cryptocurrency account with other cryptocurrency accounts by communicating transaction data to the cryptocurrency computer network 120. The user 140 may also log in to a user account to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the service provider server 130 over the network 160. In one implementation, the user interface application 112 includes a software program (e.g., a mobile application) that provides a graphical user interface (GUI) for the user 140 to interface and communicate with the service provider server 130 and/or the cryptocurrency computer network 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, as operating system registry entries, cookies associated with the user interface application 112 and/or the wallet application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet (e.g., a cryptocurrency account), and/or a particular profile.

The user device 110 may include a wallet application 116 configured to facilitate cryptocurrency transactions for the user 140. In some embodiments, the wallet application 116 may be associated with a cryptocurrency account (e.g., a digital wallet) of the user 140 such that funds (e.g., in a cryptocurrency, etc.) can be transferred from the cryptocurrency account of the user 140 to another cryptocurrency account of another user (e.g., the wallet application 186 of the user device 180, the wallet application 196 of the user device 190, or other wallet application associated with another entity, etc.) using the wallet application 116. In some embodiments, the wallet application 116 may be configured to perform cryptocurrency transactions. The user 140, through the user interface provided by the wallet application 116 on the user device 110, may initiate a cryptocurrency transaction (e.g., transferring a particular amount in a cryptocurrency from the digital wallet of the user 140 to another digital wallet). In some embodiments, the wallet application 116 may initiate online cryptocurrency transactions. For example, the user 140 may specify an identity of a recipient cryptocurrency account, and an amount in the cryptocurrency via the user interface of the wallet application 116. The wallet application 116 may broadcast transaction data associated with the cryptocurrency transaction over the cryptocurrency computer network 120.

As discussed herein, the requirement of broadcasting and recording the transaction data to the distributed ledger in real-time (as required by processing online cryptocurrency transactions) prevents cryptocurrency transactions from being conducted when connectivity to the cryptocurrency computer network is limited (e.g., when the user device 110 has insufficient network bandwidth to transfer the transaction data to any computer node within the cryptocurrency computer network 120). Furthermore, the verification process (e.g., the proof-of-work process, the proof-of-stake process, etc.) can consume a large amount of computer resources within the cryptocurrency computer network 120.

As such, according to various embodiments of the disclosure, devices (e.g., the user devices 110, 180, and 190, etc.) may be enabled to conduct offline cryptocurrency transactions even when the devices involved in the transactions lack connectivity to the cryptocurrency computer network 120 at the time that the transactions are conducted. In some embodiments, the offline cryptocurrency transactions are conducted via transaction applications that are executed within secure enclaves of devices involved in the transactions. As such, the user device 110 may include a secure enclave 118 for facilitating offline cryptocurrency transactions. The secure enclave 118 is a dedicated hardware subsystem within the user device 110 that includes at least a processor and a memory and that is separated from the main processor and memory associated with the user device 110. The secure enclave 118 is isolated from the main processor and designed to store data that would remain secure even when the main processor of the user device 110 becomes compromised. In some embodiments, the secure enclave 118 may include a read-only memory that stores all of the computer software programs (including the transaction application) to be executed by the secure enclave 118. Reading and/or writing of data in the memory (e.g., random access memory) of the secure enclave 118 is controlled by the computer software applications executed within the secure enclave 118 such that no other processors, including the main processor of the device, can access the data stored in the memory of the secure enclave. In some embodiments, the secure enclave 118 may include one or more sensors, such as a frequency sensor, a voltage sensor, a light sensor, etc., for detecting physical tampering of the secure enclave 118. In some embodiments, upon detecting a possible physical tampering of the secure enclave 118, a program executed within the secure enclave 118 would automatically be triggered to wipe out the data stored within the secure enclave 118 to further improve the security of the secure enclave 118.

In various implementations, the user 140 is able to input data and information into an input component (e.g., a keyboard) of the user device 110. For example, the user 140 may use the input component to interact with the UI application 112, the digital wallet 116, and the transaction application executed within the security enclave 118 (e.g., to conduct cryptocurrency transactions, etc.).

Each of the user devices 180 and 190 may include similar hardware and software components as the user device 110 to enable their respective users to interact with the cryptocurrency computer network 120, the service provider server 130, and other devices (e.g., to conduct cryptocurrency transactions, etc.) through the user devices 180 and 190. For example, the users of the user devices 110, 180, and 190 may use the respective devices to conduct cryptocurrency transactions through different user cryptocurrency accounts. As such, each of the user devices 180 and 190 also includes a wallet application (e.g., the wallet applications 186 and 196, respectively) configured to perform cryptocurrency functionalities, in a similar manner as the wallet application 116. Each of the user devices 180 and 190 also includes a secure enclave (e.g., the secure enclaves 188 and 198, respectively) and transaction applications executed within the secure enclaves 188 and 198 configured to conduct offline cryptocurrency transactions. Each of the secure enclaves 188 and 198 may include similar attributes as the secure enclave 118.

The service provider server 130, in one embodiment, may be maintained by a transaction processing entity or an online service provider, which may provide processing for electronic transactions between different entities (e.g., among the users of the user devices 110, 180, and 190, between a user and one or more business entities, or other types of payees. As such, the service provider server 130 may include a service application 138, which may be adapted to interact with the user devices 110, 180, and 190 over the network 160 to facilitate the searching, selection, purchase, payment of items, and/or other services offered by the service provider server 130. In one example, the service provider server 130 may be provided by PayPal©, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130 (e.g., such as the cryptocurrency transaction services as disclosed herein). The interface server 134 may also include other electronic pages associated with the different services (e.g., electronic transaction services, etc.) offered by the service provider server 130. As a result, a user (e.g., the user 140, users of the user devices 180 and 190, etc.) may access a user account (e.g., a cryptocurrency account) associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts (e.g., one or more cryptocurrency accounts that are linked to the wallet applications 116, 186, and 196) in an account database 136, each of which may be associated with a profile and may include account information associated with one or more individual users (e.g., the user 140 associated with user device 110, users associated with the user devices 180 and 190, etc.). The account information may include an identifier of a cryptocurrency account and an identifier of a transaction application associated with each user account of a user. In one implementation, a user may have credentials to authenticate or verify identity with the service provider server 130. Thus, the service provider server may store the credentials of the users in corresponding records of the account database 136 associated with the user accounts.

In various embodiments, the service provider server 130 includes a transaction module 132 configured to facilitate cryptocurrency transactions for the users (e.g., the user 140, the users of the user devices 180 and 190, etc.). In some embodiments, the transaction module 132 may be one of the computer nodes within the cryptocurrency computer network 120, and is configured to maintain and manage the distributed ledger associated with the cryptocurrency. Upon receiving transaction data associated with a cryptocurrency transaction from a user via a wallet application or a transaction application, the transaction module 132 may be configured to broadcast the transaction data to other computer nodes within the cryptocurrency computer network 120, and perform the verification and recording processes as disclosed herein. In some embodiments, the transaction module 132 may also be configured to register transaction applications with the cryptocurrency computer network 120 and to reserve funds in the cryptocurrency for conducting offline cryptocurrency transactions.

Figure 2A:
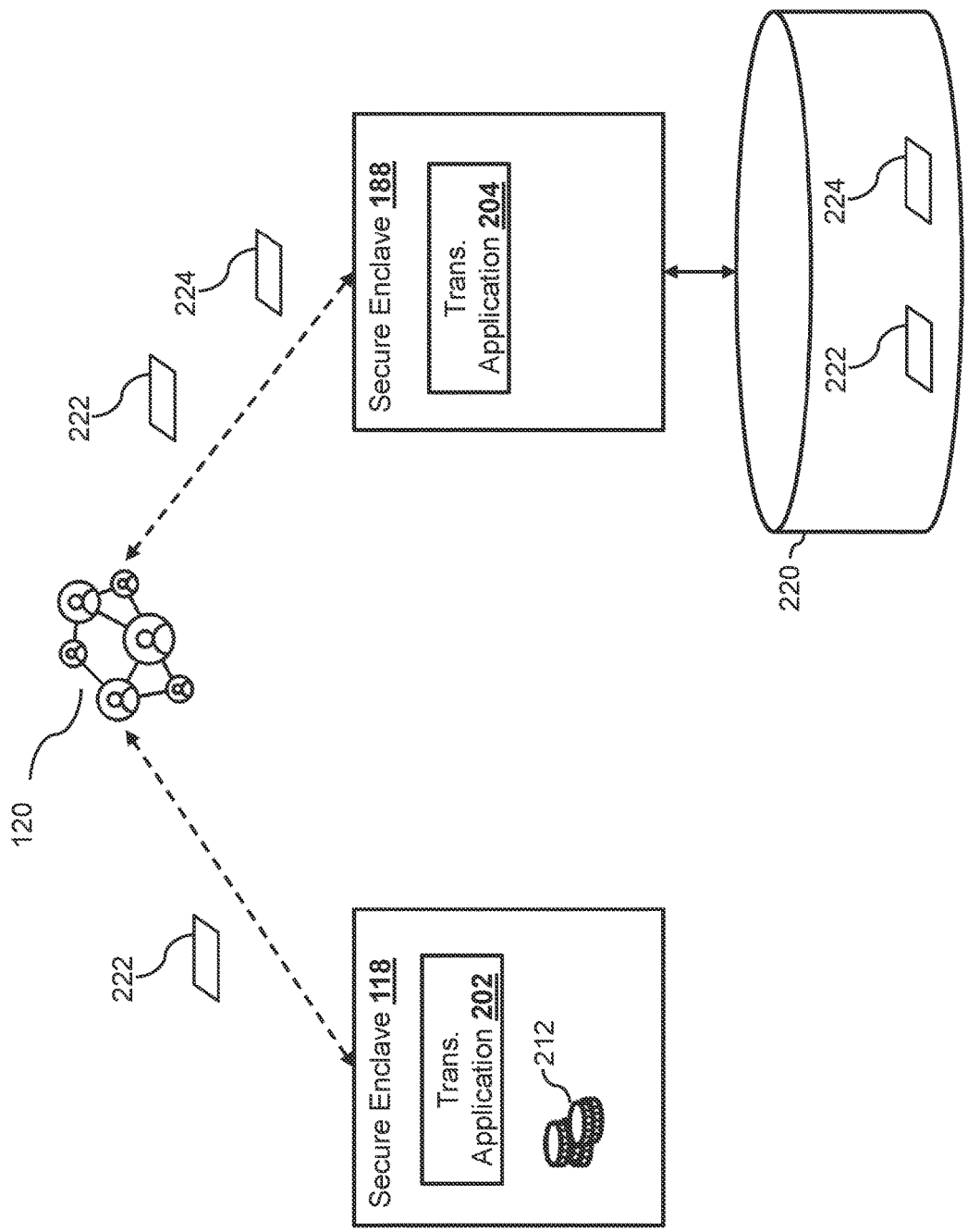
FIGS. 2A-2C illustrate various stages in conducting an offline cryptocurrency transaction under the framework according to an embodiment of the present disclosure.
Figure 2B:
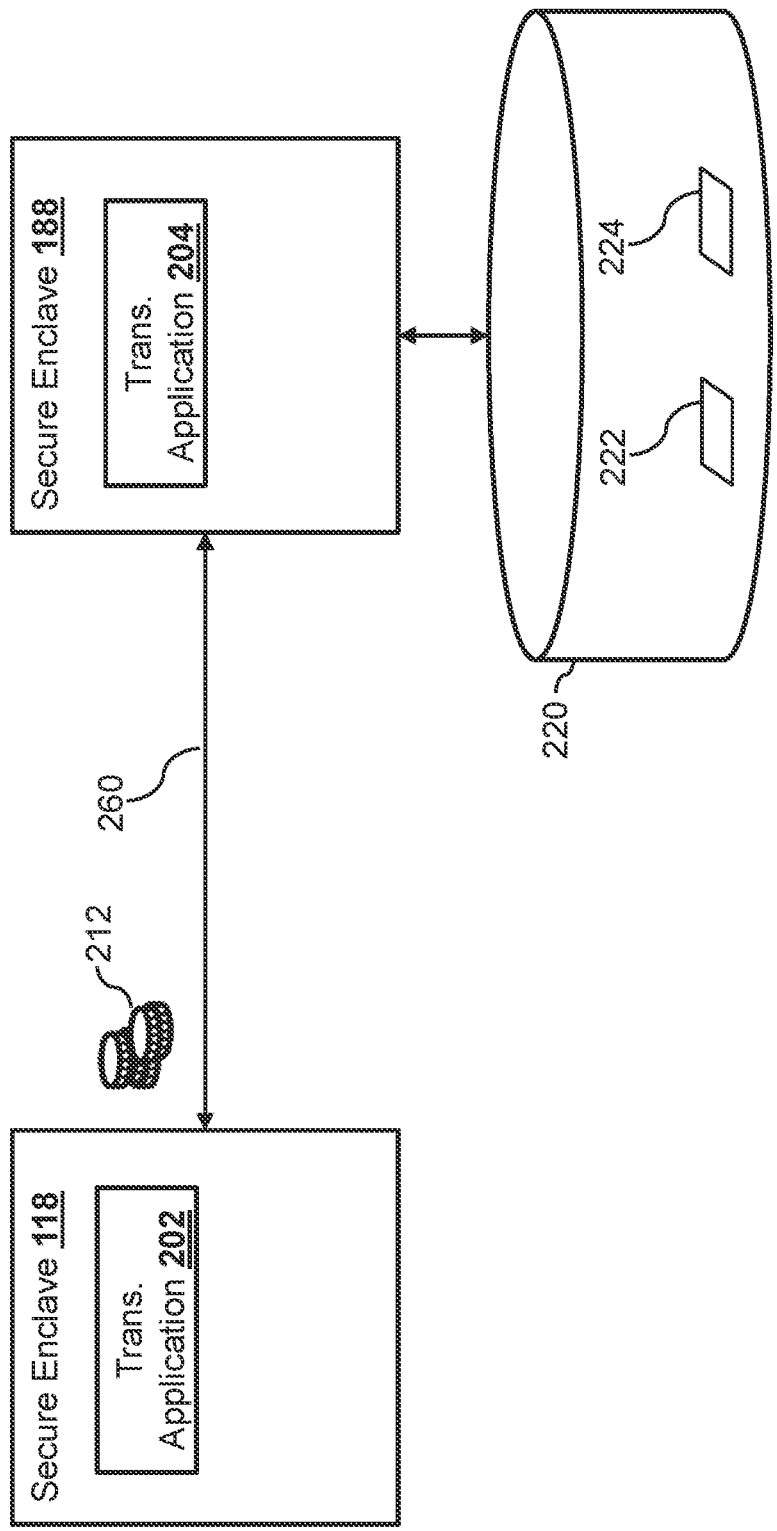
Figure 2C:
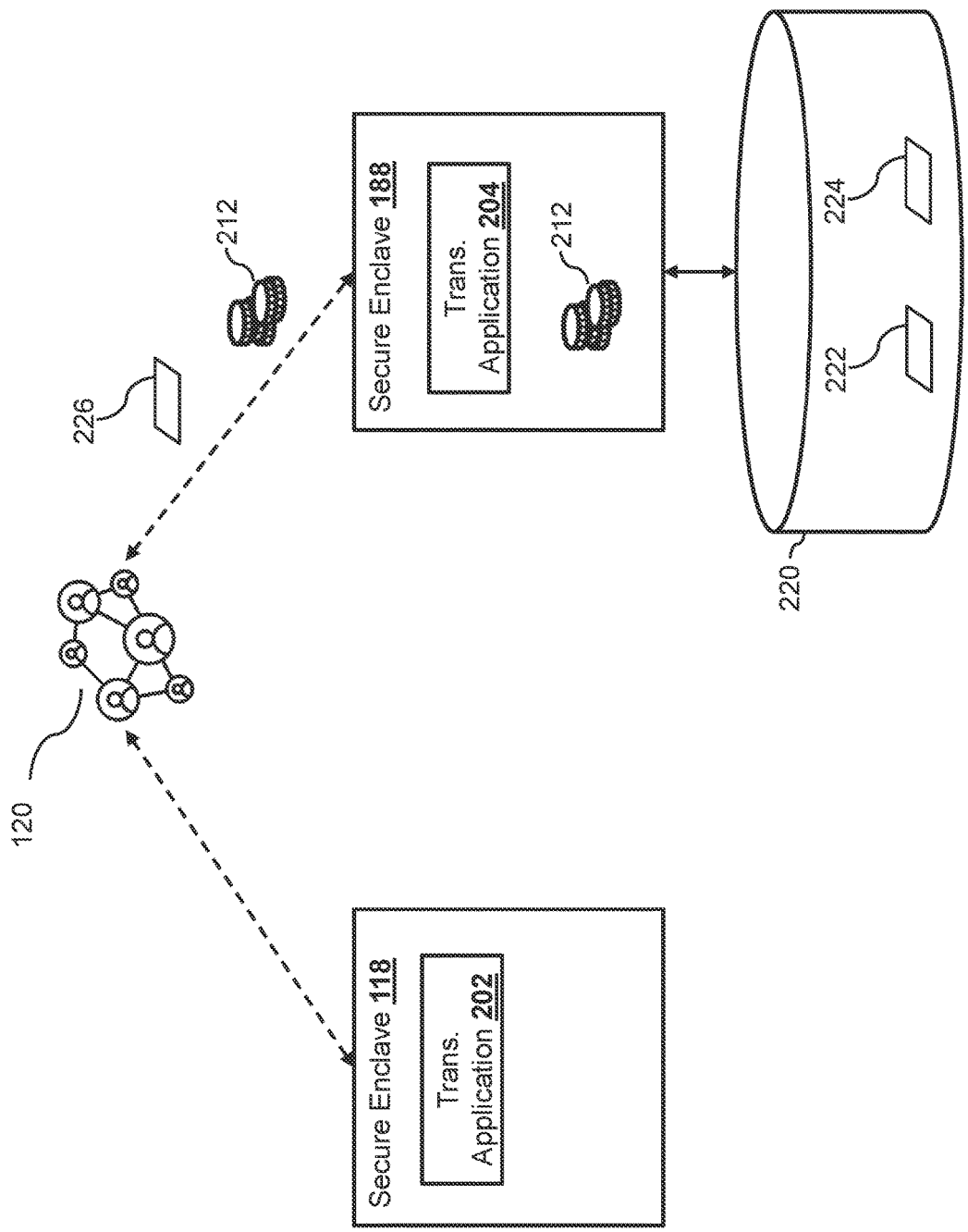

FIGS. 2A, 2B, and 2C illustrate various stages in conducting an offline cryptocurrency transaction under the framework according to various embodiments of the disclosure. Specifically, FIG. 2A illustrates the steps for registering a transaction application with the cryptocurrency computer network 120 for performing offline cryptocurrency transactions and reserving a denomination of cryptocurrency for use in one or more offline cryptocurrency transactions. FIG. 2B illustrates the steps for conducting an offline cryptocurrency transaction between two transaction applications. FIG. 2C illustrates the steps of committing the transaction data associated with the offline cryptocurrency transaction to the distributed ledger.

As discussed herein, offline cryptocurrency transactions may be conducted by transaction applications that are executed within secure enclaves of devices. Thus, each of the secure enclaves 118, 188, and 198 of user devices 110, 180, and 190, respectively, may include a transaction application configured to facilitate offline cryptocurrency transactions under the framework. As shown in FIG. 2A, the secure enclave 118 of the user device 110 includes a transaction application 202, and the secure enclave 188 of the user device 180 includes a transaction application 204. Offline cryptocurrency transactions may be conducted between the transaction applications 202 and 204 using the framework as disclosed herein.

In order to initiate offline cryptocurrency transactions, a user (e.g., the user 140) is required to register the transaction application with the cryptocurrency computer network 120 for performing offline cryptocurrency transactions. In this example, the transaction application 202 may register itself with the cryptocurrency computer network 120 for performing offline cryptocurrency transactions when the connectivity of the user device 110 with the cryptocurrency computer network 120 is available. To register, the transaction application 202 may generate a pair of asymmetrical keys for application-based signing (e.g., encrypting), which are also known as application-based signing keys (an application-based private key and an application-based public key). The transaction application 202 may also generate remote attestation information based on attributes associated with the secure enclave 118 and the transaction application 202. In some embodiments, the remote attestation information may include a signed copy of the programming code associated with the transaction application 202 that is signed (e.g., encrypted) using the application-based private key of the transaction application 202. Based on the signed copy of the programming code, any device that has access to the signed copy of the programming code may (i) verify that the programming code is based on the transaction application 202 (e.g., by decrypting the signed programming code using the application-based public key of the transaction application 202) and (ii) determine attributes of the transaction application 202 (a make and version number of the transaction application 202) that is included in the secure enclave 118 and whether the transaction application 202 has been tampered with (e.g., by analyzing the programming code, a device may determine whether malicious code has been added to the transaction application 202, any modification has been done to the transaction application 202, any code deleted from the transaction application 202, etc.). The remote attestation information may also include attributes associated with the secure enclave 118 (e.g., a hardware and/or software security capability and configuration of the secure enclave 118), a signed copy of the identifier of the cryptocurrency account of the user 140 that is signed (e.g., encrypted) using the application-based private key of the transaction application 202, and the application-based public key generated by the transaction application 202 (for use by other devices to decrypt the signed data).

The transaction application 202 may then transmit a package 222 that includes the remote attestation information to the cryptocurrency computer network 120 (e.g., via the transaction module 132 of the service provider server 130) to be recorded on the distributed ledger. The remote attestation information serves to show the integrity of the transaction application 202 and that the transaction application 202 is configured to maintain the integrity of the cryptocurrency (e.g., the recordation of the signed copy of the programming code ensures that anyone that has access to the distributed ledger can verify that the transaction application 202 would behave according to the transaction communication protocol of the framework and would not behave in a malicious manner). The transaction application 202 may also store the signed remote attestation information in the secure enclave 118 of the user device 101.

Once the transaction application 202 has registered itself with the cryptocurrency computer network 120 for performing offline cryptocurrency transactions, the transaction application 202 may reserve any portion (or the entirety) of the cryptocurrency possessed by the user 140 via the cryptocurrency account of the user 140 for use in one or more offline cryptocurrency transactions for a duration of time. For example, the user 140 may plan to purchase items or services using cryptocurrency in a remote area where cellular connection may be limited. Before going to the remote area and while the device 110 still has sufficient network connectivity to communicate with the cryptocurrency computer network 120, the user 140 may request to reserve an amount of cryptocurrency for use in one or more offline cryptocurrency transactions in the future. In some embodiments, the transaction application 118 may provide a user interface on the user device 110 to interact with the user 140. Through the user interface, the user 140 may request to reserve any portion of cryptocurrency possessed by the cryptocurrency account of the user 140. The user 140 may specify a particular amount of cryptocurrency (e.g., a particular denomination, such as a coin, five coins, a Satoshi, seven Satoshi, an ether, 10 weis, etc.) to be reserved and a duration of the reservation (e.g., an expiration time, such as 3 hours from a current time, a day from the current time, a month from the current time, etc.). In one example, the user 140 may plan a trip to an area (e.g., a farmer's market located in a remote area with limited cellular services, etc.). Based on the length of the trip, the transaction application 202 may instruct the user 140 to reserve more time than the trip such that the recipient device may have sufficient time to commit the offline cryptocurrency transactions to the distributed ledger after the transaction is complete.

In response to receiving the request, the transaction application 202 may generate another pair of asymmetrical keys for token-based signing, which is known as the token-based keys (e.g., a token-based private key and a token-based public key). The transaction application 202 may also generate a token 212 to represent the particular denomination for use in the one or more offline cryptocurrency transactions. The token may include a hashed message authentication code (HMAC) address for the token (which can be used by other transaction applications to identify the token 212 and to locate the remote attestation information and other data associated with the secure enclave 118 and the reserved cryptocurrency denomination stored on the distributed ledger), the particular denomination reserved by the transaction application 202 and represented by the token 212, the expiration time of the token 212, and the remote attestation information of the transaction application 202. In some embodiments, the transaction application 202 may also sign (e.g., encrypt) the token 212 using the token-based private key of the transaction application 202.

The transaction application 202 may transmit a request to reserve the particular denomination of cryptocurrency to the cryptocurrency computer network 120 (e.g., via the transaction module 132 of the service provider server 130). The request may include the token 212 intended for representing the particular denomination of cryptocurrency. Upon receiving the request, the cryptocurrency computer network 120 (or the transaction module 132 of the service provider server 130) may perform a transaction (e.g., executing a contract and recording it on the distributed ledger) to reserve the particular denomination (e.g., to put on hold) owned by the cryptocurrency account of the user 140 for a time period until the expiration time of the token 212. The reservation of the particular denomination, which is recorded on the distributed ledger as a transaction (e.g., a contract), prevents the particular denomination from being used (e.g., spent) by the user 140 in any online cryptocurrency transactions in the absence of a signed token 212 that is signed (e.g., encrypted) using the token-based private key of the transaction application 202.

Based on the reservation of the particular denomination for the cryptocurrency account of the user 140, the cryptocurrency computer network 120 may generate a record that links the token 212 and the remote attestation information of the transaction application 202 to the cryptocurrency account of the user 140. The cryptocurrency computer network 120 may store the record on the distributed ledger, such that any devices associated with a cryptocurrency account may download the record to be used for verification purposes in an offline cryptocurrency transaction with the cryptocurrency account of the user 140. For example, the transaction application 204 executed in the secure enclave 188 of the user device 180 may download, from the distributed ledger, the remote attestation information 222 and the record 224 to a data storage 220 (and also remote attestation information and records associated with other cryptocurrency accounts in anticipation of conducting offline cryptocurrency transactions with any cryptocurrency accounts). The data storage 220 may be part of the secure enclave 188 or outside of the secure enclave 188.

After registering with the cryptocurrency computer network 120 and reserving the particular cryptocurrency denomination, the transaction application 202 may initiate offline cryptocurrency transactions through the cryptocurrency account of the user 140 with another transaction application via a peer-to-peer connection, without the need of connecting to the distributed ledger (or the cryptocurrency computer network 120).

FIG. 2B illustrates the processes and communications between the transaction applications 202 and 204 for conducting an offline cryptocurrency transaction. In this example, the transaction application 202 may be instructed by the user 140 to perform an offline cryptocurrency transaction with the transaction application 204 executed within the secure enclave 188 of the device 180. For example, while the user 140 is at the remote area, the user 140 may wish to purchase an item or a service from a user (e.g., a merchant) of the user device 180. The transaction application 202 may establish a peer-to-peer connection 260 with the transaction application 204 (e.g., a Bluetooth® connection, a near-field connection, a WiFi connection, etc.). The transaction application 202 may transmit a request for performing an offline cryptocurrency transaction with the transaction application 204. In some embodiments, the transaction application 204 may first determine whether the connectivity with the cryptocurrency computer network 120 is available. If the connectivity with the cryptocurrency computer network 120 is available, the transaction application 204 may determine to conduct an online cryptocurrency transaction, instead of an offline cryptocurrency transaction, with the transaction application 202, and may decline the request.

If the transaction application 204 determines not to decline the request (e.g., based on a determination that the connectivity with the cryptocurrency computer network 120 is unavailable, etc.), the transaction application 204 may proceed to verify the security of the secure enclave 118 and the transaction application 202, and the authenticity of the token 212 being transferred to the user device 180. In some embodiments, after the transaction application 204 accepts the request, the transaction application 202 may sign (e.g., encrypt) the token 212 along with a timestamp representing a current time using the token-based private key associated with the transaction application 202. The transaction application 202 may transmit the signed token, the timestamp, and the signed remote attestation information to the transaction application 204 via the peer-to-peer connection 260. The transaction application 204 may decrypt the signed token 212 using the token-based public key associated with the transaction application 202 and verify that the token 212 is representative of the particular cryptocurrency denomination (e.g., the particular amount of coins, the particular amount of Satoshis, the particular amount of ether, the particular amount of weis, etc.) of the cryptocurrency account of the user 140 by comparing the decrypted token 212 against the token in the record 224.

By decrypting the signed token 212 using the token-based public key associated with the transaction application 202 and the records 224, the transaction application 204 may further verify that the transaction application 202 is associated with the cryptocurrency account of the user 140. In some embodiments, the transaction application 204 may analyze the remote attestation information associated with the transaction application 202 to determine whether the secure enclave 118 and the transaction application 202 satisfy a set of security requirements. The set of security requirements may include a make and a minimum version number of secure enclaves (that the secure enclave 118 is made by an approved manufacturers with a version higher than a threshold version number, etc.) and/or a set of hardware/software security requirements (e.g., the presence of certain sensors, such as light sensor, frequency sensor, etc., the presence of certain software security measures, etc.). The set of requirements may be determined automatically by the transaction application 204 or by the user of the device 180. In some embodiments, the transaction application 204 may decline the request to perform the offline cryptocurrency transaction with the transaction application 202 if the transaction application 204 determines that the secure enclave 118 or the transaction application 202 fails to satisfy the set of security requirements (e.g., the version of the secure enclave 118 is too old, the secure enclave 118 lacks one or more required hardware or software security features, etc.).

In some embodiments, the transaction application 204 may also verify that the timestamp received from the transaction application 202 (or the current time) indicates a time that is after the time when the token 212 was generated and before the expiration time of the token 212. In some embodiments, the transaction application 204 may also determine whether a difference between the current time and the expiration time of the token 212 is larger than a threshold (e.g., 3 hours, a day, etc., which can be determined by the transaction application 204 or by the user of the device 180) such that the transaction application 204 has sufficient time to record the transaction on the distributed ledger after completing the offline cryptocurrency transaction with the transaction application 202. In some embodiments, the transaction application 204 may decline the request to conduct the offline cryptocurrency transaction (e.g., abort the transaction process) with the transaction application 202 when the difference between the current time and the expiration time of the token 212 is not larger than the threshold.

If the transaction application 204 determines to decline the request to conduct the offline cryptocurrency transaction with the transaction application 202, the transaction application 204 may transmit a termination signal to the transaction application 202 via the peer-to-peer connection 260, and may remove all of the data received from the transaction application 202 related to the offline cryptocurrency transaction. However, if the transaction application 204 determines to continue processing the offline cryptocurrency transaction, the transaction application 204 may transmit a confirmation signal to the transaction application 202 via the peer-to-peer connection 260. The confirmation signal indicates that the transaction application 204 has accepted the signed token 212 from the transaction application 202. The transaction application 204 may then store the signed token 212 in the secure enclave 188 of the user device 180. Upon receiving the confirmation signal, the transaction application 202 may delete the signed token 212 from the secure enclave 118 to ensure that the token 212 will not be spent again (e.g., the transaction application 202 may no longer use the token in any other offline cryptocurrency transaction). In some embodiments, the transaction application 202 may transmit a token deletion signal to the transaction application 204 via the peer-to-peer connection 260, indicating that the token 212 has been removed from the secure enclave 118 to confirm that the transaction application 204 has the only copy of the signed token 212.

After the offline cryptocurrency transaction between the transaction applications 202 and 204 is complete and before the expiration of the token 212, the transaction application 204 may commit the offline cryptocurrency transaction to the distributed ledger, such that the transaction data associated with the offline cryptocurrency transaction can be verified and recorded on the distributed ledger. FIG. 2C illustrates the steps for committing the offline cryptocurrency transaction to the distributed ledger. As discussed above, one of the reasons for conducting the offline cryptocurrency transaction between the transaction applications 202 and 204 is that neither the device 110 nor the device 180 has connectivity to the distributed ledger (the cryptocurrency computer network 120) at the time the transaction was conducted. Thus, after completing the offline cryptocurrency transaction, the transaction application 204 may monitor the connectivity between the device 180 and the cryptocurrency computer network 120 (e.g., the transaction module 132 of the service provider server 130).

For example, the transaction application 204 may attempt to communicate with a computer node (e.g., the transaction module 132 of the service provider server 130) of the cryptocurrency computer network 120 (e.g., periodically such as every five minutes, every hour, etc.). The transaction application 204 may transmit a signal to a network address associated with the computer node via a network (e.g., the network 160) and determine whether a response signal from the computer node is received. In some embodiments, the transaction application 204 may be configured to attempt to communicate with a computer node of the cryptocurrency computer network 120 in a progressively shorter interval, such that the transaction application 204 may attempt to communicate to the cryptocurrency computer network 120 more frequently as it is closer to the expiration time of the token 212. For example, immediately after completing the offline cryptocurrency transaction, the transaction application 204 may begin with attempting to communicate with the cryptocurrency computer network 120 every hour. As it gets closer to the expiration time of the token 212, the transaction application 204 may increase the frequency of communication attempts to every five minutes, every minute, every second, etc.

When the transaction application 204 determines that the connectivity with the distributed ledger (e.g., with a node within the cryptocurrency computer network 120) is available, the transaction application 204 may communicate the signed token 212 and other transaction data 226 associated with the offline cryptocurrency transaction to the node within the cryptocurrency computer network 120 (e.g., the transaction module 132 of the service provider server 130). The communication of the signed token 212 and the transaction data 226 to the cryptocurrency computer network 212 may trigger the verification and recordation of the offline cryptocurrency transaction on the distributed ledger, in a similar manner as an online cryptocurrency transaction is verified and recorded. After committing the offline cryptocurrency transaction to the distributed ledger, the transaction application 204 may be configured to remove the signed token 212 from the secure enclave 188 to prevent the user of the user device 180 from using the signed token 212 in another offline cryptocurrency transaction (the signed token 212 is no longer valid after committing the offline cryptocurrency transaction to the distributed ledger). Thus, using the framework as disclosed herein, cryptocurrency transactions can be conducted between devices associated with cryptocurrency accounts even when the devices temporarily lose connectivity with the distributed ledger.

Figure 3A:
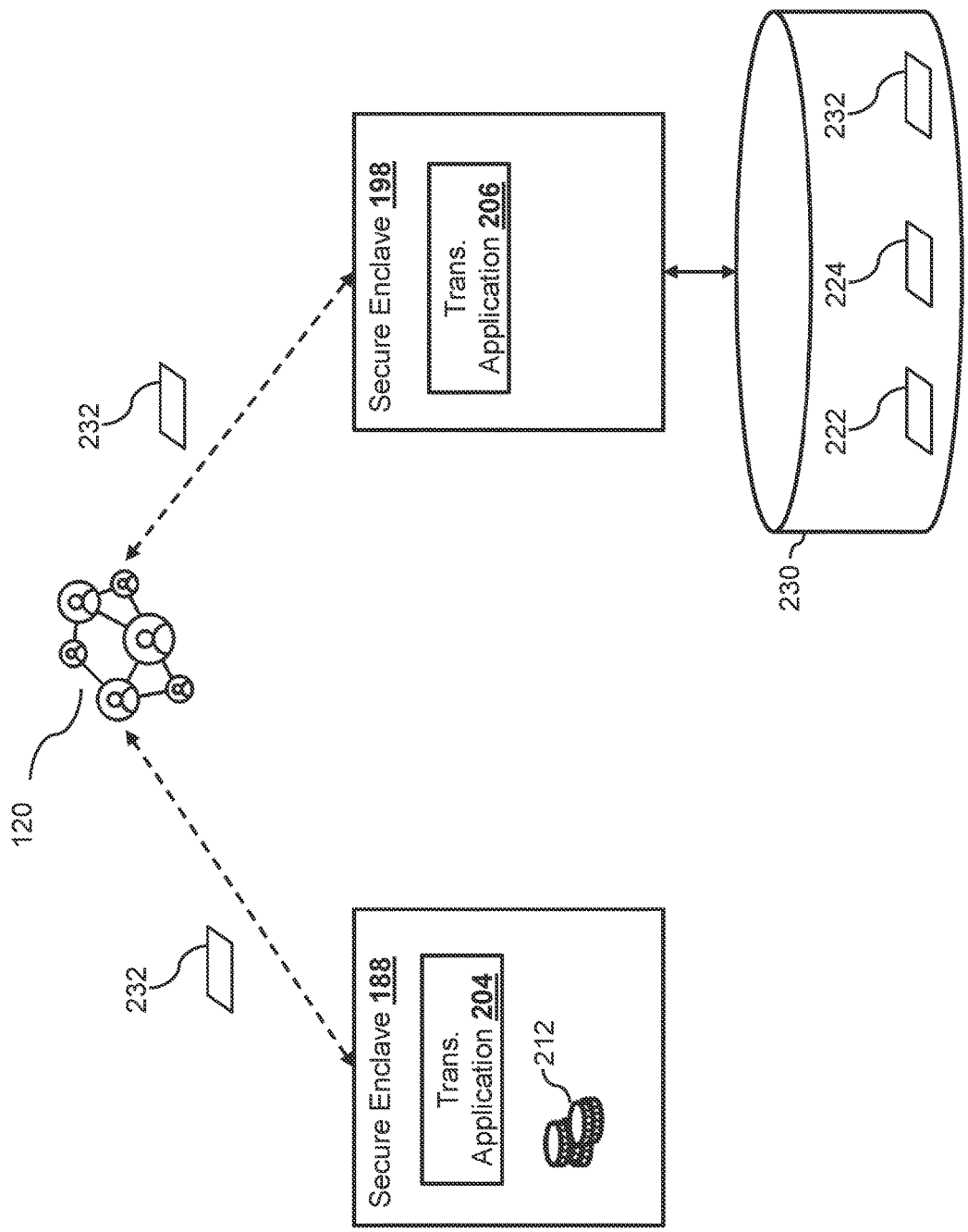
FIGS. 3A-3C illustrate various stages in conducting a chained offline cryptocurrency transaction under the framework according to an embodiment of the present disclosure.
Figure 3B:
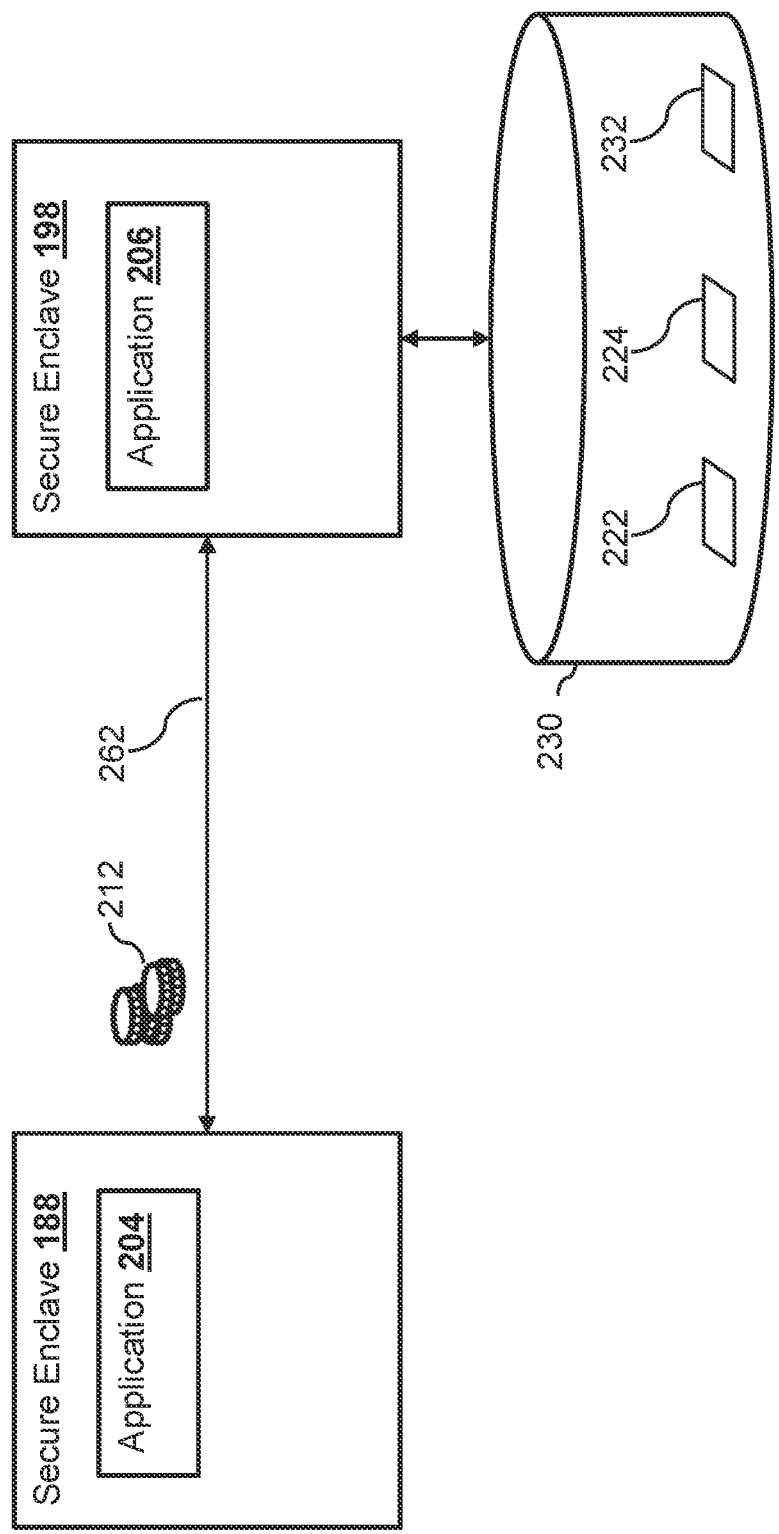
Figure 3C:
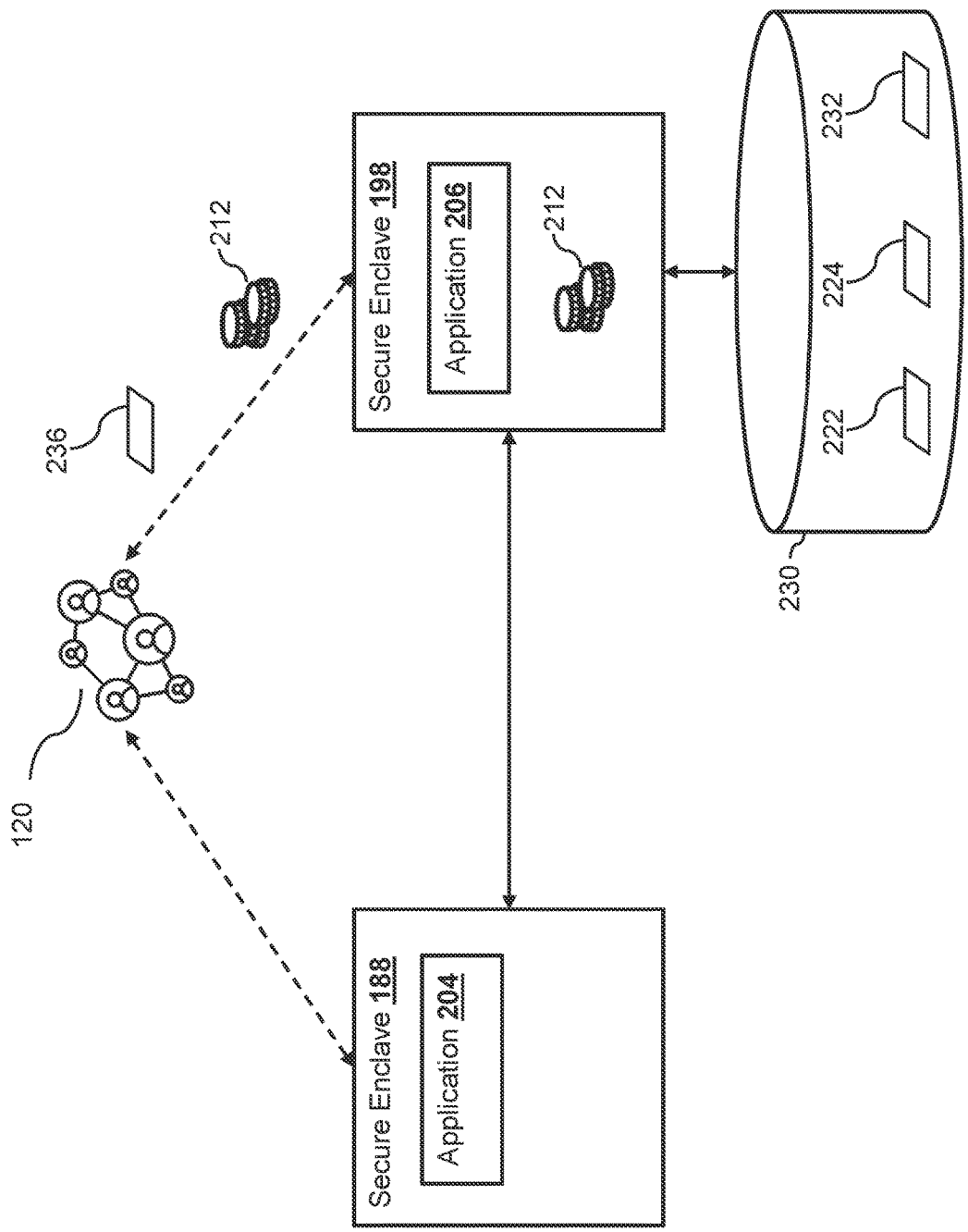

In some embodiments, instead of committing the offline cryptocurrency transaction to the distributed ledger, the transaction application 204 may use the signed token 212 to conduct additional offline cryptocurrency transactions with other transaction applications. When the same token is used in subsequent offline cryptocurrency transactions in series, the sequence of offline cryptocurrency transactions conducted using the same token is referred to as a chain of offline cryptocurrency transactions, and each offline cryptocurrency transaction within the chain is a chained offline cryptocurrency transaction. FIGS. 3A, 3B, and 3C illustrate various stages in a chained offline cryptocurrency transaction conducted under the framework according to various embodiments of the disclosure. Specifically, FIG. 3A illustrates steps for registering a transaction application with the cryptocurrency computer network 120 for performing offline cryptocurrency transactions. FIG. 3B illustrates the steps for conducting a chained offline cryptocurrency transaction between two transaction applications. FIG. 3C illustrates the steps of committing the transaction data associated with the offline cryptocurrency transaction to the distributed ledger.

In some embodiments, in order for the transaction application 204 to initiate offline cryptocurrency transactions with other transaction applications, the transaction application 204 may register itself with the cryptocurrency computer network 120 for performing offline cryptocurrency transactions when the connectivity of the user device 180 with the cryptocurrency computer network 120 is available. FIG. 3A illustrates the registration of the transaction application 204 with the cryptocurrency computer network 120 for conducting offline cryptocurrency transactions. The steps for registering the transaction application 204 with the cryptocurrency computer network 120 for conducting offline cryptocurrency transactions is similar to the steps for registering the transaction application 202 disclosed above with respect to FIG. 2A. For example, the transaction application 204 may generate a pair of asymmetrical keys for application-based signing, which are also known as application-based signing keys (an application-based private key and an application-based public key). The transaction application 204 may generate remote attestation information based on attributes associated with the secure enclave 188. In some embodiments, the remote attestation information may include a signed copy of the programming code associated with the transaction application 204 that is signed (e.g., encrypted) using the application-based private key of the transaction application 204 (which may indicate a make and version number of the transaction application 204), attributes associated with the second secure enclave 188 (e.g., a hardware and/or software security capability and configuration of the second secure enclave 188), a signed copy of the identifier of the cryptocurrency account associated with the user device 180 that is signed (e.g., encrypted) using the application-based private key of the transaction application 204, and the application-based public key generated by the transaction application 204. As shown in FIG. 3A, the transaction application 204 may transmit a package 232 that includes the remote attestation information to the cryptocurrency computer network 120 to be recorded on the distributed ledger. Since a chained offline cryptocurrency transaction re-uses the token obtained from a previous offline cryptocurrency transaction, there is no need to generate additional tokens and/or reserve additional denomination of cryptocurrency.

Other transaction applications may download the package 232 (along with the package 222 and the record 224 associated with the transaction application 202) from the distributed ledger when the connectivity with the cryptocurrency computer network 120 is available. For example, a transaction application 206 executed in the secure enclave 198 of the user device 190 may download packages and records associated with different transaction applications when the connectivity with the cryptocurrency computer network 120 is available, in anticipation of conducting offline cryptocurrency transactions with other transaction applications. The downloaded packages and records may include the package 232 associated with the transaction application 204, and the package 222 and the record 224 associated with the transaction application 202. The transaction application 206 may store the package 232, the package 222, and the record 224 in a data storage 230. The data storage 230 may be part of the secure enclave 198 or outside of the secure enclave 198.

After registering with the cryptocurrency computer network 120, the transaction application 204 may initiate offline cryptocurrency transactions with another transaction application via a peer-to-peer connection using the signed token 212 obtained from the transaction application 202, without the need of connecting to the distributed ledger (or the cryptocurrency computer network 120).

FIG. 3B illustrates the processes and communications between the transaction applications 204 and 206 for conducting a chained offline cryptocurrency transaction. In this example, the transaction application 204 may be instructed by the user of the user device 180 to initiate a chained offline cryptocurrency transaction with the transaction application 206 executed within the secure enclave 198 of the device 190. The transaction application 204 may establish a peer-to-peer connection 262 with the transaction application 206 (e.g., a Bluetooth® connection, a near-field connection, a WiFi connection, etc.). The transaction application 204 may transmit a request for performing an offline cryptocurrency transaction with the transaction application 206. In some embodiments, the transaction application 206 may first determine whether the connectivity with the cryptocurrency computer network 120 is available. If the connectivity with the cryptocurrency computer network 120 is available, the transaction application 206 may determine to conduct an online cryptocurrency transaction, instead of an offline cryptocurrency transaction, with the transaction application 204, and may decline the request.

If the transaction application 206 determines not to decline the request (e.g., based on a determination that the connectivity with the cryptocurrency computer network 120 is unavailable, etc.), the transaction application 206 may proceed to verify the authenticity of the token 212 and the security of any secure enclaves within which the token 212 has been stored through a chain of offline cryptocurrency transactions that involves the token 212. For example, based on information (e.g., the remote attestation information associated with the transaction applications 202 and 204, etc.) received from the transaction application 204, the transaction application 206 may determine that the token was originated from the transaction application 202, and was transmitted to the transaction application 204 in a previous cryptocurrency transaction between the transaction applications 202 and 204.

Thus, the transaction application 206 may verify the authenticity of the token 212, the security of the secure enclaves 118 and 188, and the security of the transaction applications 202 and 204. In some embodiments, after the transaction application 206 accepts the request, the transaction application 204 may sign (e.g., encrypt) the token 212 (which has already been signed using the token-based private key associated with the transaction application 202) using the token-based private key associated with the transaction application 204. As such, the token 212 is now signed with two different private keys, one associated with the transaction application 202 and the other one associated with the transaction application 204. The transaction application 204 may transmit the signed token 212, a timestamp, and the signed remote attestation information associated with the transaction application 204 to the transaction application 206 via the peer-to-peer connection 262. The transaction application 206 may decrypt the signed token 212 using first the token-based public key associated with the transaction application 204, and then the token-based public key associated with the transaction application 202. The transaction application 206 may verify that the token 212 is representative of the particular cryptocurrency denomination (e.g., the particular amount of coins, the particular amount of Satoshis, the particular amount of ether, the particular amount of weis, etc.) of the cryptocurrency account of the user 140 by comparing the decrypted token 212 against the token in the record 224.

By decrypting the signed token 212 using the token-based public keys associated with the transaction applications 202 and 204, the transaction application 206 may further verify that the chain of offline cryptocurrency transactions includes a previous offline cryptocurrency transaction between the transaction applications 202 and 204. In some embodiments, the transaction application 204 may analyze the remote attestation information associated with the transaction application 202 and the remote attestation information associated with the transaction application 204 to determine whether the secure enclaves 118 and 188 satisfy a set of security requirements. The set of security requirements may include a make and a minimum version number of secure enclaves (that the secure enclaves 118 and 188 are made by an approved manufacturer with a version higher than a threshold version number, etc.) and/or a set of hardware/software security requirements (e.g., the presence of certain sensors, such as light sensor, frequency sensor, etc., the presence of certain software security measures, etc.). The set of requirements may be determined automatically by the transaction application 206 or by a user of the user device 190. In some embodiments, the transaction application 206 may decline the request to perform the offline cryptocurrency transaction with the transaction application 204 if the transaction application 206 determines that the secure enclave 118 or the secure enclave 188 fails to satisfy the set of security requirements (e.g., the version of either of the secure enclaves is too old, either of the secure enclaves lacks one or more required hardware or software security features, etc.).

In some embodiments, the transaction application 206 may also verify that the timestamp received from the transaction application 204 (or the current time) indicates a time that is after the time when the token 212 was generated and before the expiration time of the token 212. In some embodiments, the transaction application 206 may also determine whether a difference between the current time and the expiration time of the token 212 is larger than a threshold (e.g., 3 hours, a day, etc.) such that the transaction application 206 has sufficient time to record the transaction on the distributed ledger after completing the offline cryptocurrency transaction with the transaction application 204. In some embodiments, the transaction application 206 may decline the request to conduct the offline cryptocurrency transaction (e.g., abort the transaction process) with the transaction application 204 when the difference between the current time and the expiration time of the token 212 is not larger than the threshold.

If the transaction application 206 determines to decline the request to conduct the offline cryptocurrency transaction with the transaction application 204, the transaction application 206 may transmit a termination signal to the transaction application 204 via the peer-to-peer connection 262, and may remove all of the data received from the transaction application 204 related to the offline cryptocurrency transaction. However, if the transaction application 206 determines to continue processing the offline cryptocurrency transaction, the transaction application 206 may transmit a confirmation signal to the transaction application 204 via the peer-to-peer connection 262. The confirmation signal indicates that the transaction application 206 has accepted the signed token 212 from the transaction application 204. The transaction application 206 may then store the signed token 212 in the secure enclave 198 of the user device 190. Upon receiving the confirmation signal, the transaction application 204 may delete the signed token 212 from the secure enclave 188 to ensure that the token 212 will not be double-spent (e.g., the transaction application 204 may no longer use the token in any other offline cryptocurrency transaction). In some embodiments, the transaction application 204 may transmit a token deletion signal to the transaction application 206 via the peer-to-peer connection 262, indicating that the token 212 has been removed from the secure enclave 188 to confirm that the transaction application 206 has the only copy of the signed token 212.

After the offline cryptocurrency transaction between the transaction applications 204 and 206 is complete and before the expiration of the token 212, the transaction application 206 may commit the chain of offline cryptocurrency transactions to the distributed ledger, such that the transaction data associated with the chain of offline cryptocurrency transactions can be verified and recorded on the distributed ledger. FIG. 3C illustrates the steps for committing the chain of offline cryptocurrency transactions to the distributed ledger. In some embodiments, after completing the offline cryptocurrency transaction with the transaction application 204, the transaction application 206 may attempt to communicate with the cryptocurrency computer network 120 in a similar manner discussed above by reference to FIG. 2C. For example, the transaction application 206 may attempt to communicate with a computer node (e.g., the transaction module 132 of the service provider server 130) of the cryptocurrency computer network 120 (e.g., periodically such as every five minutes, every hour, etc.). The transaction application 206 may transmit a signal to a network address associated with the computer node via a network (e.g., the network 160) and determine whether a response signal from the computer node is received. In some embodiments, the transaction application 206 may be configured to attempt to communicate with a computer node of the cryptocurrency computer network 120 in a progressively shorter interval, such that the transaction application 206 may attempt to communicate to the cryptocurrency computer network 120 more frequently as it is closer to the expiration time of the token 212. For example, immediately after completing the offline cryptocurrency transaction, the transaction application 206 may begin with attempting to communicate with the cryptocurrency computer network 120 every hour. As it gets closer to the expiration time of the token 212, the transaction application 206 may increase the frequency of communication attempts to every five minutes, every minute, every second, etc.

When the transaction application 206 determines that the connectivity with the distributed ledger (e.g., with a node within the cryptocurrency computer network 120) is available, the transaction application 206 may communicate the signed token 212 and other transaction data 236 associated with the chain of offline cryptocurrency transactions (e.g., including the transaction data associated with the offline cryptocurrency transaction between the transaction applications 202 and 204, and the transaction data associated with the offline cryptocurrency transaction between the transaction applications 204 and 206) to the node within the cryptocurrency computer network 120 (e.g., the transaction module 132 of the service provider server 130). The communication of the signed token 212 and the transaction data 236 to the cryptocurrency computer network 212 may trigger the verification and recordation of the chain offline cryptocurrency transactions (the two sequential cryptocurrency transactions) on the distributed ledger, in a similar manner a sequence of online cryptocurrency transactions is verified and recorded. After committing the chain of offline cryptocurrency transactions to the distributed ledger, the transaction application 206 may be configured to remove the signed token 212 from the secure enclave 198 to prevent the user of the user device 190 from using the signed token 212 in another offline cryptocurrency transaction (the signed token 212 is no longer valid after committing the chain of offline cryptocurrency transactions to the distributed ledger). Performing and committing a chain of multiple offline cryptocurrency transactions to the distributed ledger also provide additional efficiency benefits. Since the chain of offline cryptocurrency transactions is verified and recorded on the distributed ledger by the cryptocurrency computer network 120 as a whole, the total amount of computer resources required for processing all of the transactions within the chain would be less than the amount of computer resources required for processing those transactions separately, as a single verification may be performed for all of the transactions in the chain.

In the examples illustrated above, each of the offline cryptocurrency transactions were conducted using the token representing the entire cryptocurrency denomination that is reserved for the transaction application. In some embodiments, the framework also enables offline cryptocurrency transactions to be conducted using a portion of the entire cryptocurrency denomination. FIG. 4 illustrates an example of splitting a reserved amount of cryptocurrency into multiple sub-denominations for use in offline cryptocurrency transactions. In the example illustrated in FIG. 4, after generating the initial token 212 (also referred to as the "parent token"), the transaction application 202 may split the particular cryptocurrency denomination into multiple portions by generating multiple child tokens (e.g., tokens 412 and 414) based on the parent token 212. Each of the child tokens 412 and 414 may include a reference to the parent token 212 (e.g., the HMAC address of the parent token 212), an HMAC address associated with the child token, a timestamp indicating the time that the child token is generated, and a sub-denomination representing a particular portion of the particular cryptocurrency denomination. The transaction application 202 may then record the child tokens 412 and 414 on the distributed ledger in association with the parent token 212 in a similar manner that the parent token is recorded. The cryptocurrency computer network 120 may generate a record 424 that links the child tokens 412 and 414 to the cryptocurrency account of the user 140. Thus, other transaction applications (e.g., the transaction application 204) may download the package 222 that includes the remote attestation information of the transaction application 202 along with the record 424 in anticipation of conducting future offline cryptocurrency transactions with the transaction application 202. The transaction application 202 may then use any of the child tokens 412 and 414 to conduct offline cryptocurrency transactions with other transaction applications (e.g., the transaction application 204). Upon receiving a request to conduct an offline cryptocurrency transaction with the transaction application 202 based on the child token 412, the transaction application 204 may verify the token using at least the record 424 downloaded from the distributed ledger.

Figure 5:
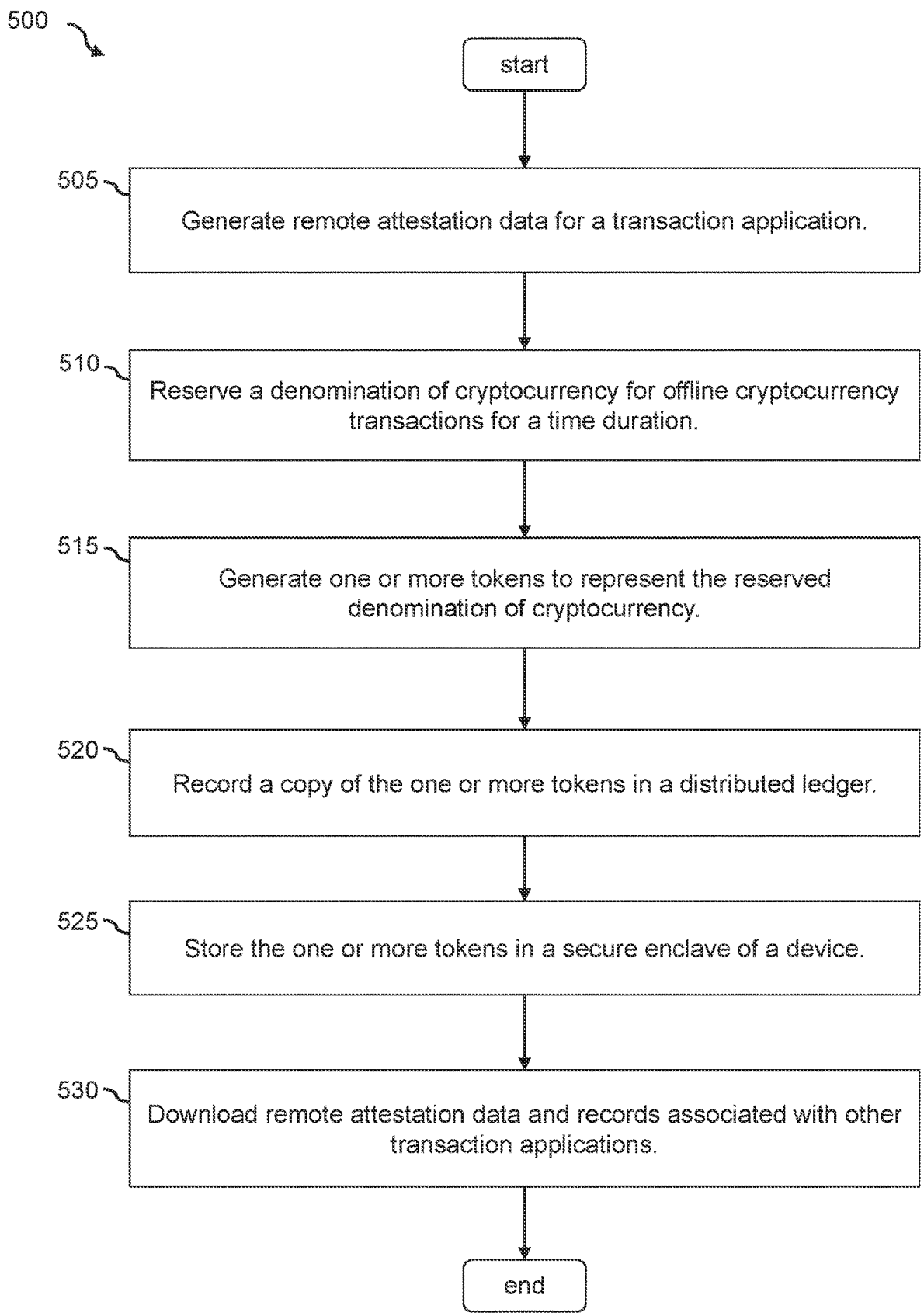
FIG. 5 is a flowchart showing a process of registering a transaction application and reserving a denomination of cryptocurrency for use in offline cryptocurrency transactions according to an embodiment of the present disclosure.

FIG. 5 illustrates a process 500 for registering a transaction application with a cryptocurrency computer network and reserving a denomination of cryptocurrency for offline cryptocurrency transactions according to various embodiments of the disclosure. In some embodiments, at least a portion of the process 500 may be performed by a transaction application (e.g., the transaction application 202). The process 500 may begin by generating (at step 505) remote attestation data for a transaction application. For example, in order to initiate offline cryptocurrency transactions (e.g., transferring cryptocurrency to another account) with other transaction applications, the transaction application 202 may register itself with the cryptocurrency computer network 120. The transaction application 202 may generate remote attestation information based on attributes of the transaction application 202 and the secure enclave 118 in which the transaction application 202 is executed. The remote attestation information may include information associated with the programming code of the transaction application 202 (e.g., a version number of the programming code, etc.) and information associated with the secure enclave 118 (e.g., a make and version number of the secure enclave 118, security features of the secure enclave 118, etc.).

The process 500 then reserves (at step 510) a denomination of cryptocurrency for offline cryptocurrency transactions for a time duration. For example, the transaction application 202 may submit a request to the cryptocurrency computer network 120 for reserving a denomination (e.g., a coin, 3 coins, etc.) of cryptocurrency. The process 500 also generates (at step 515) one or more tokens to represent the reserved denomination of cryptocurrency and records (at step 520) a copy of the one or more tokens in the distributed ledger. For example, the transaction application 202 may generate a token 212 to represent the denomination of cryptocurrency for use in the one or more offline cryptocurrency transactions. The token 212 may indicate the denomination of cryptocurrency it represents and an expiration time. The transaction application 202 may transmit a copy of the token 212 to the cryptocurrency computer network 120 to be recorded on the distributed ledger.

The process 500 stores (at step 525) the one or more tokens in a secure enclave of a device. For example, the transaction application 202 may store the token 212 in the secure enclave 118 of the user device 110. The process 500 also downloads (step 530) remote attestation data and records associated with other transaction applications. For example, other transaction applications (e.g., the transaction applications 204 and 206) may also register themselves with the cryptocurrency computer network and may reserve denominations of cryptocurrency for offline cryptocurrency transactions. As such, the transaction application 202 may download, from the distributed ledger, the remote attestation data and records (that link tokens to different cryptocurrency accounts) associated with the transaction applications 204 and 206. Similarly, the transaction applications 204 and 206 may also download, from the distributed ledger, the remote attestation data and records associated with the transaction application 202.

Figure 6:
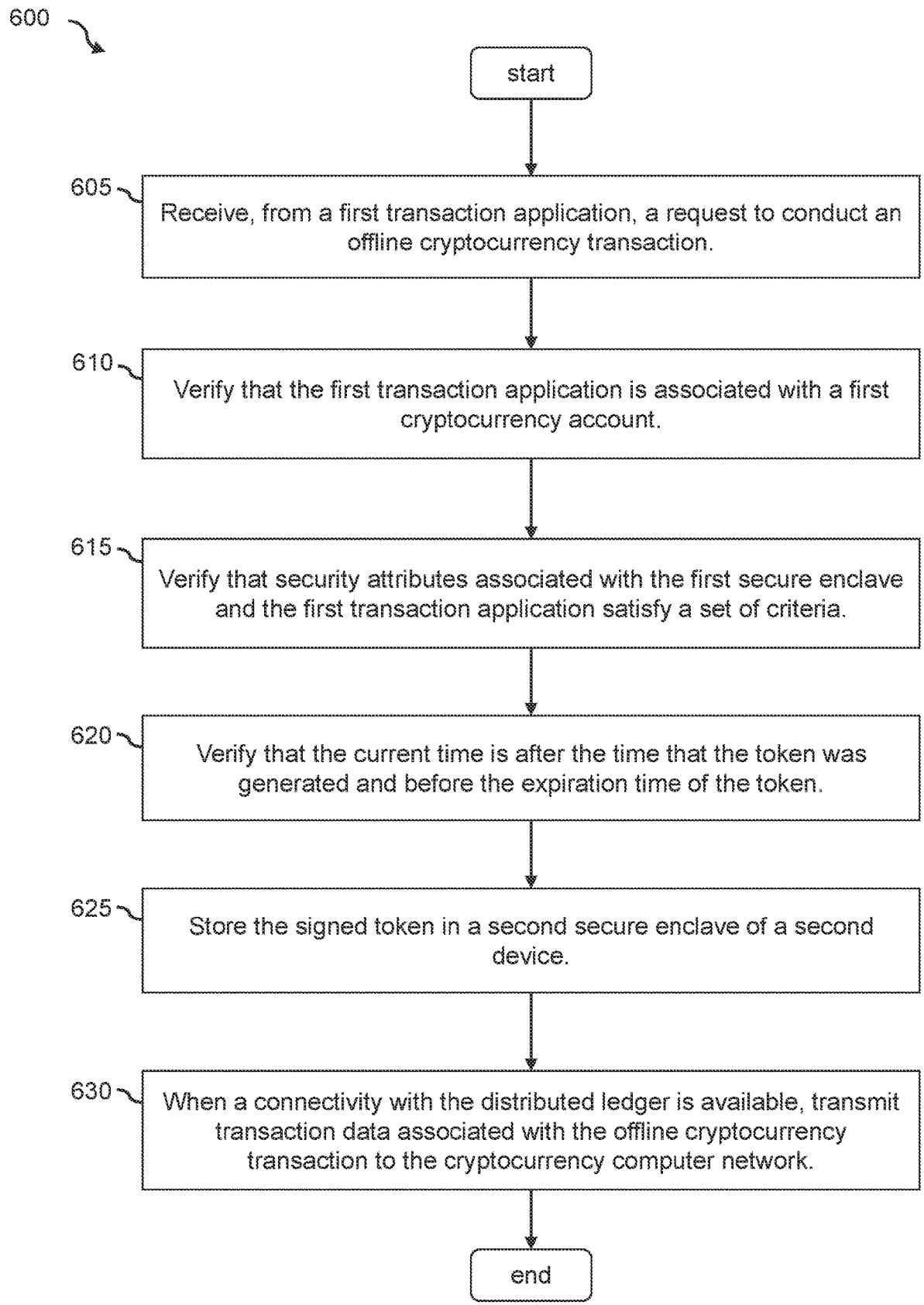
FIG. 6 is a flowchart showing a process of conducting an offline cryptocurrency transaction according to an embodiment of the present disclosure.

FIG. 6 illustrates a process 600 for conducting an offline cryptocurrency transaction according to various embodiments of the disclosure. In some embodiments, at least a portion of the process 600 may be performed by a transaction application (e.g., the transaction application 204). The process 600 may begin by receiving (at step 605), from a first transaction application, a request to conduct an offline cryptocurrency transaction. For example, the transaction application 204 may receive a request to conduct an offline cryptocurrency transaction with the transaction application 202 via the peer-to-peer connection 260 established between the user devices 110 and 180.

The process 600 then performs a series of verifications before accepting the offline cryptocurrency transaction. Specifically, the process 600 verifies (at step 610) that the first transaction application is associated with a first cryptocurrency account, verifies (at step 615) that security attributes associated with the first secure enclave and the first transaction application satisfy a set of criteria, and verifies (at step 620) that the current time is after the time that the token was generated and before the expiration time of the token. For example, the transaction application 204 may use a public key associated with the transaction application 202 to decrypt the token 212 and use the record from the distributed ledger to verify that the transaction application 202 is associated with a particular cryptocurrency account that owns the particular denomination of cryptocurrency represented by the token 212. The transaction application 204 may also analyze the remote attestation information associated with the transaction application 202 to determine whether the attributes of the secure enclave 118 and the transaction application 202 satisfy a set of criteria.

When the verification steps are successfully completed, the process 600 stores (at step 625) the signed token in a second secure enclave of a second device. For example, the transaction application 202 may sign the token 212 using a private key associated with the transaction application 202 and transmit the signed token 212 to the transaction application 204 via the peer-to-peer connection 260. If the transaction application 204 accepts the signed token 212 (e.g., completed all of the verification steps), the transaction application 204 may store the signed token 212 in the secure enclave 188, and may transmit a confirmation signal to the transaction application 202. Upon receiving the confirmation signal, the transaction application 202 may delete the signed token 212 from the secure enclave 118.

The process 600 then transmits (at step 630) transaction data associated with the offline cryptocurrency transaction to the cryptocurrency computer network when a connectivity with the distributed ledger is available. For example, after conducting the offline cryptocurrency transaction with the transaction application 202, the transaction application 204 may monitor the connectivity with the distributed ledger (e.g., the cryptocurrency computer network 120). When the connectivity with the distributed ledger becomes available, the transaction application 204 may transmit transaction data associated with the offline cryptocurrency transaction to the cryptocurrency computer network 120 such that the offline cryptocurrency transaction can be verified and recorded by the cryptocurrency computer network 120 on the distributed ledger in the same manner as processing an online cryptocurrency transaction.

FIG. 7 is a block diagram of a computer system 700 suitable for implementing one or more embodiments of the present disclosure, including the service provider server 130, any computer node within the cryptocurrency computer network 120, and the user devices 110, 180, and 190. In various implementations, each of the devices 110, 180, and 190 may include a mobile cellular phone, personal computer (PC), laptop, wearable computing device, etc. adapted for wireless communication, and each of the service provider server 130 and any node in the cryptocurrency computer network 120 may include a network computing device, such as a server. Thus, it should be appreciated that the devices/servers 110, 130, 180, and 190, and any computer nodes in the cryptocurrency computer network 120 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the functionalities related to conducting offline cryptocurrency transactions described herein according to the processes 500 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
retrieving, from a blockchain associated with a particular cryptocurrency, data comprising (i) attestation information associated with a first application residing in a first secure enclave of a first device and (ii) a record associated with one or more tokens generated for a first cryptocurrency wallet, wherein the record links the one or more tokens and the attestation information to the first cryptocurrency wallet;
subsequent to the retrieving, receiving, by the second device and from the first application of the first device via a wireless connection, a request to perform an offline fund transfer transaction associated with the particular cryptocurrency based on a signed token, wherein the offline fund transfer transaction is for transferring funds from the first cryptocurrency wallet to a second cryptocurrency wallet, and wherein the signed token is signed using a first key associated with the first secure enclave;
determining that the signed token is linked to the first cryptocurrency wallet based on the record;
accessing the attestation information based on an identity of the first application;
deriving a set of attributes associated with the first secure enclave based on the record attestation information and a second key, wherein the set of attributes represents at least a software configuration or a hardware configuration associated with the first secure enclave;
verifying that the at least the software configuration or the hardware configuration associated with the first secure enclave has met a security requirement associated with a second application of the second device based on the set of attributes; and
in response to the verifying, processing the offline fund transfer transaction by:
storing the signed token in a second secure enclave of the second device;

subsequent to the storing the signed token, determining that the blockchain associated with the particular cryptocurrency is accessible by the second device; and in response to determining that the blockchain associated with the particular cryptocurrency is accessible by the second device, causing transaction data associated with the offline fund transfer transaction to be recorded on the blockchain.

2. The system of claim 1, wherein the operations further comprise:

verifying, based on the record stored on the second device, that the second key is linked to the first cryptocurrency wallet.

3. The system of claim 2, wherein the operations further comprise:

prior to the receiving the request, downloading, from the blockchain, a plurality of records associated with a plurality of cryptocurrency wallets to the second device.

4. The system of claim 1, wherein the set of attributes represents the software configuration, and wherein the software configuration comprises a software version of the first application.

5. The system of claim 1, wherein the set of attributes comprises at least a software security attribute of the first secure enclave.

6. The system of claim 1, wherein the operations further comprise:

determining that the signed token is further signed with a third key associated with a third secure enclave of a third device based on a transfer of the signed token from the third secure enclave to the first secure enclave; and verifying the request based on the third key.

7. The system of claim 1, wherein the operations further comprise:

determining that the blockchain is inaccessible by the second device when the request is received, wherein the offline fund transfer transaction is processed in response to the determining that the blockchain is inaccessible by the second device when the request is received.

8. A method, comprising:

accessing, from a distributed ledger associated with a cryptocurrency, data comprising (i) security information associated with a first application residing in a first secure enclave of a first device and (ii) a record associated with one or more tokens generated for a first cryptocurrency account, wherein the record links the one or more tokens and the security information to the first cryptocurrency account, and wherein the data is stored on a second device;

receiving, by a second application of the second device and from the first application of the first device via a wireless connection, a request to perform an offline cryptocurrency transaction based on a signed token, wherein the offline cryptocurrency transaction is for transferring a denomination of the cryptocurrency from the first cryptocurrency account to a second cryptocurrency account, and wherein the signed token is signed using a private key associated with the first application;

determining, by the second application, that the signed token is linked to the first cryptocurrency account based on the record;

accessing, by the second application, the security information based on an identity of the first application;

deriving, by the second application, a set of attributes associated with the first secure enclave based on the security information and a public key associated with the first application, wherein the set of attributes represents a security configuration associated with the first secure enclave;

verifying, by the second application, that the security configuration has met a set of requirements associated with the second application based on the set of attributes; and in response to the verifying, processing, by the second application, the offline cryptocurrency transaction by:

storing the signed token in a second secure enclave of the second device;

subsequent to the storing the signed token, determining that the distributed ledger associated with the cryptocurrency is accessible by the second device; and in response to determining that the distributed ledger associated with the cryptocurrency is accessible by the second device, causing transaction data associated with the offline cryptocurrency transaction to be recorded on the distributed ledger.

9. The method of claim 8, further comprising:

establishing a second wireless connection with a third device;

signing the signed token using a second private key associated with the second secure enclave; and transmitting a second request to perform a second offline cryptocurrency transaction associated with the cryptocurrency to a third application executed in a third secure enclave of the third device based on the signed token.

10. The method of claim 9, further comprising:

in response to determining that the signed token has been accepted by the third application, deleting the signed token from the second secure enclave.

11. The method of claim 8, wherein the offline cryptocurrency transaction is a first offline cryptocurrency transaction, and wherein the method further comprises:

determining that the signed token is further signed using a second private key associated with a third application executed in a third secure enclave of a third device based on a transfer of the signed token from the third secure enclave to the first secure enclave during a second offline cryptocurrency transaction;

accessing second security information based on an identity of the third application;

deriving a second set of attributes associated with the third secure enclave of the third device based on the second security information and using a second public key associated with the third application, wherein the verifying is further based on the second set of attributes.

12. The method of claim 11, further comprising:

determining a chain of offline cryptocurrency transactions based on the signed token, wherein the chain of offline cryptocurrency transactions comprises an ordered set of transactions that includes the second offline cryptocurrency transaction and the first offline cryptocurrency transaction; and in response to determining that the distributed ledger is accessible by the second device, causing transaction data associated with the chain of offline cryptocurrency transactions to be recorded on the distributed ledger.

13. The method of claim 8, wherein the signed token comprises a first hashed message authentication code (HMAC).

14. The method of claim 13, wherein the signed token is a child token that has been split from a parent token, and wherein the signed token comprises a second HMAC associated with the parent token.

15. A non-transitory machine-readable medium having stored thereon machine-readable instructions executable to cause a machine to perform operations comprising:
retrieving, to the machine and from a distributed ledger associated with a particular cryptocurrency, (i) security attributes associated with a first application residing in a first secure enclave of a first device and (ii) a record associated with one or more tokens generated for a first cryptocurrency account, wherein the record links the one or more tokens and the security attributes to the first cryptocurrency account;
subsequent to the retrieving, receiving, from the first application of the first device via a wireless connection, a request to perform an offline cryptocurrency transaction based on a signed token, wherein the offline cryptocurrency transaction is for transferring a denomination of the particular cryptocurrency from the first cryptocurrency account to a second cryptocurrency account, and wherein the signed token is signed using a private key associated with the first application;
determining that the signed token is linked to the first cryptocurrency account based on the record;
accessing the security attributes based on an identity of the first application;
verifying that the first secure enclave has met a security threshold based on the security attributes;
storing the signed token in a second secure enclave of the machine;
subsequent to the storing the signed token, determining that the distributed ledger associated with the particular cryptocurrency is accessible by the machine; and
in response to determining that the distributed ledger associated with the particular cryptocurrency is accessible by the machine, causing data associated with the offline cryptocurrency transaction to be recorded on the distributed ledger.

16. The non-transitory machine-readable medium of claim 15, wherein the operations further comprise:
determining an expiration time of the signed token; and
determining that a difference between a current time and the expiration time is larger than a threshold.

17. The non-transitory machine-readable medium of claim 15, wherein the operations further comprise:
verifying, based on the record, that the private key is linked to the first cryptocurrency account.

18. The non-transitory machine-readable medium of claim 17, wherein the operations further comprise:
downloading a plurality of records associated with a plurality of cryptocurrency accounts to the machine from the distributed ledger via a network.

19. The non-transitory machine-readable medium of claim 15, wherein the security attributes represent a manufacturer of the first application.

20. The non-transitory machine-readable medium of claim 19, wherein the security attributes represent a manufacture date of the first secure enclave.

* * * * *

UNITED STATES PATENT AND TRADEMARK OFFICE
CERTIFICATE OF CORRECTION

| | |
|---|---|
| PATENT NO. | : 12,211,017 B2 |
| APPLICATION NO. | : 17/722776 |
| DATED | : January 28, 2025 |
| INVENTOR(S) | : Christopher Man-kit Chan and Michael Jim Tien Chan |

It is certified that error appears in the above-identified patent and that said Letters Patent is hereby corrected as shown below:

In the Claims

Claim 1, Column 28, Line 54, change "secure enclave based on the record attestation" to --secure enclave based on the attestation--.

Signed and Sealed this
Eighteenth Day of March, 2025

Coke Morgan Stewart
*Acting Director of the United States Patent and Trademark Office*